(12) United States Patent
Park et al.

(10) Patent No.: US 11,789,270 B2
(45) Date of Patent: Oct. 17, 2023

(54) OPTICAL DEVICE

(71) Applicant: SAMSUNG DISPLAY CO., LTD., Yongin-si (KR)

(72) Inventors: Jeong Woo Park, Yongin-si (KR); Jae Joong Kwon, Suwon-si (KR); Ju Hwa Ha, Seoul (KR); Yong Seok Kim, Seoul (KR); Soo Min Baek, Hwaseong-si (KR); Ji Yeon Seo, Hwaseong-si (KR); Hyun Sup Lee, Seoul (KR); Su Bin Jung, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 471 days.

(21) Appl. No.: 17/004,774

(22) Filed: Aug. 27, 2020

(65) Prior Publication Data

US 2021/0063751 A1 Mar. 4, 2021

(30) Foreign Application Priority Data

Aug. 28, 2019 (KR) ........................ 10-2019-0105584

(51) Int. Cl.
*G02B 27/01* (2006.01)
*G02F 1/295* (2006.01)
*F21V 8/00* (2006.01)
*G02B 7/182* (2021.01)
*G02B 5/04* (2006.01)
*G02B 17/08* (2006.01)

(52) U.S. Cl.
CPC .......... *G02B 27/0172* (2013.01); *G02B 5/04* (2013.01); *G02B 7/182* (2013.01); *G02B 17/086* (2013.01); *G02B 2027/0178* (2013.01)

(58) Field of Classification Search
USPC ....................................................... 359/633
See application file for complete search history.

(56) References Cited

U.S. PATENT DOCUMENTS

| 9,761,051 | B2 | 9/2017 | Bromer | |
|---|---|---|---|---|
| 11,073,903 | B1* | 7/2021 | Ouderkirk | .......... G02B 27/0093 |
| 11,280,997 | B1* | 3/2022 | Gao | .................... G02B 6/0076 |
| 2021/0318540 | A1* | 10/2021 | Lee | .................... G02B 19/0047 |

FOREIGN PATENT DOCUMENTS

| KR | 10-1660519 | 9/2016 |
|---|---|---|
| KR | 10-1830364 | 2/2018 |

* cited by examiner

*Primary Examiner* — Wyatt A Stoffa
*Assistant Examiner* — Grant A Gagnon
(74) *Attorney, Agent, or Firm* — F. Chau & Associates, LLC

(57) ABSTRACT

An optical device including: a display device configured to display an image; and a lens including a plurality of reflectors that reflect the image from the display device to a first surface of the lens, wherein the plurality of reflectors include: a first reflector; and a second reflector having a size different from a size of the first reflector.

30 Claims, 19 Drawing Sheets

FIG. 22
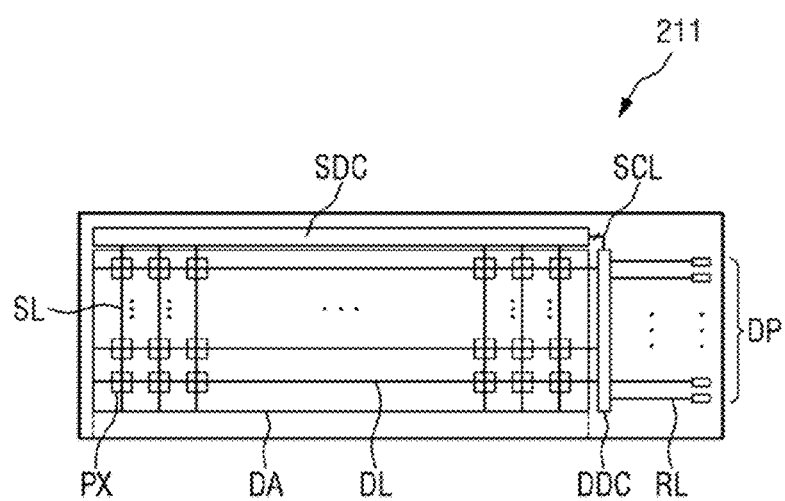
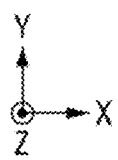

OPTICAL DEVICE

CROSS-REFERENCE TO RELATED APPLICATION

This application claims priority under 35 U.S.C. § 119 to Korean Patent Application No. 10-2019-0105584 filed on Aug. 28, 2019, the disclosure of which is incorporated by reference herein in its entirety.

TECHNICAL FIELD

Exemplary embodiments of the present inventive concept relate to an optical device, and more particularly, to an optical device for providing augmented reality.

DISCUSSION OF THE RELATED ART

Augmented reality is an interactive experience of a real-world environment where the objects that reside in the real world are enhanced by computer-generated perceptual information. For example, an augmented reality technique may involve overlaying a virtual image on a real image, which is seen by a user's eyes, and showing the two images as a single image. The virtual image may include an image in a text or graphic form, and the real image may include an actual image of an object that is observed in a field of view of a device.

An optical device for providing augmented reality may include a plurality of optical members that change an optical path of a virtual image displayed on a display device to a user's eyes. The virtual image, which is provided to the user's eyes by the plurality of optical members, may be provided in two dimensions.

SUMMARY

According to an exemplary embodiment of the present inventive concept, an optical device comprises: a display device configured to display an image; and a lens including a plurality of reflectors that reflect the image from the display device to a first surface of the lens. The plurality of reflectors include: a first reflector; and a second reflector having a size different from a size of the first reflector.

According to another exemplary embodiment of the present inventive concept, an optical device comprises: a display device configured to display an image; and a lens including a plurality of reflectors that reflect the image from the display device to a first surface of the lens. The plurality of reflectors include first reflectors and second reflectors, and a size of each of the first reflectors is different from a size of each of the second reflectors.

According to another exemplary embodiment of the present inventive concept, an optical device comprises: a display device configured to display an image; and a lens including a plurality of reflectors that reflect the image from the display device to a first surface of the lens. The lens further includes: a first lens having a first inclined surface; a second lens having a second inclined surface facing the first inclined surface; and a reflector substrate disposed between the first inclined surface of the first lens and the second inclined surface of the second lens and having a first surface on which the plurality of reflectors are disposed.

According to another exemplary embodiment of the present inventive concept, an optical device comprises: a display device configured to display an image; and a lens including a plurality of reflectors that reflect the image from the display device to a first surface of the lens. The plurality of reflectors include a first reflector, a second reflector, a third reflector, and a fourth reflector, and the second reflector and the fourth reflector are disposed between the first reflector and the third reflector in a width direction of the lens.

According to another exemplary embodiment of the present inventive concept, an optical device includes: a display device configured to display an image; and a lens including a plurality of reflectors that reflect the image from the display device to a first surface of the lens, wherein the plurality of reflectors include: a first reflector; and a second reflector having a size smaller than a size of the first reflector, wherein the second reflector is farther from a first side of a reflector substrate, which extends lengthwise in a first direction, than the first reflector in a second direction perpendicular to the first direction, and wherein the first side of the reflector substrate is adjacent to the first surface of the lens.

BRIEF DESCRIPTION OF THE DRAWINGS

The above and other features of the present inventive concept will become more apparent by describing in detail exemplary embodiments thereof with reference to the accompanying drawings, in which:

FIG. 22 is a plan view illustrating an example of a first display device of FIG. 2.

DETAILED DESCRIPTION OF THE EMBODIMENTS

Figure 1:
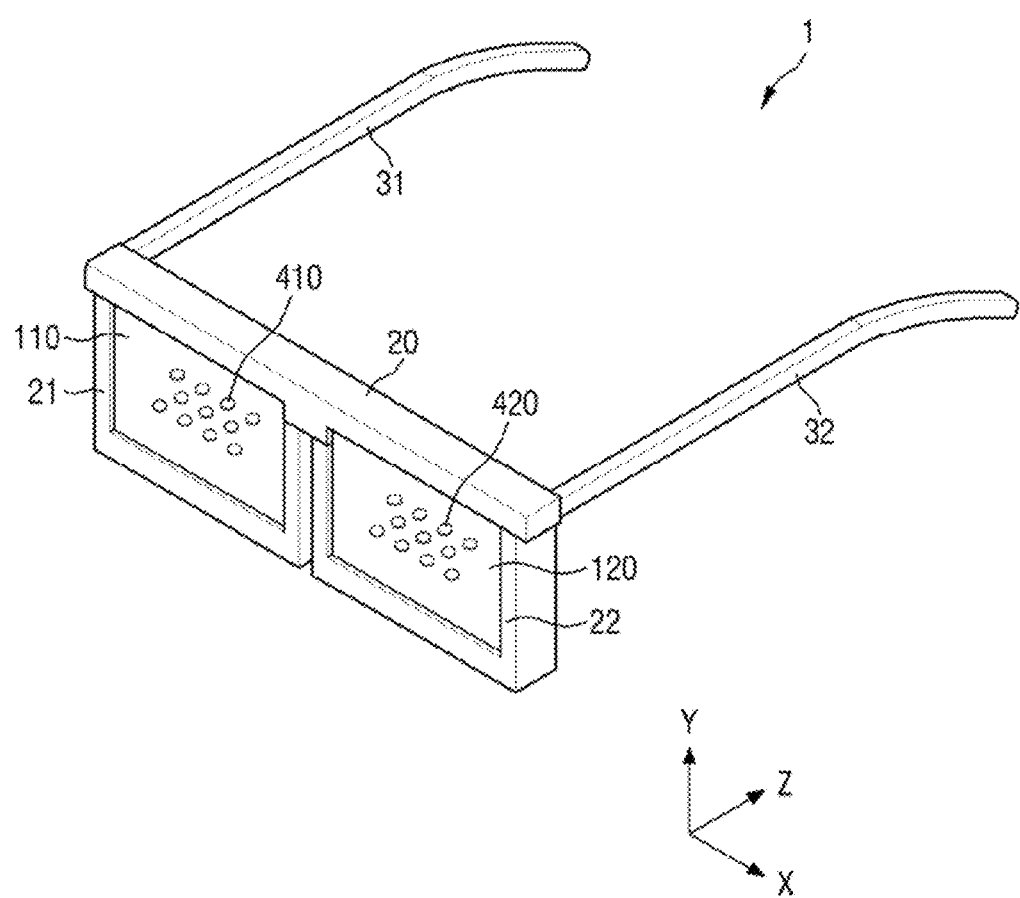
FIG. 1 is a perspective view illustrating an optical device according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each exemplary embodiment are available for other similar features or aspects in other exemplary embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

Figure 2:
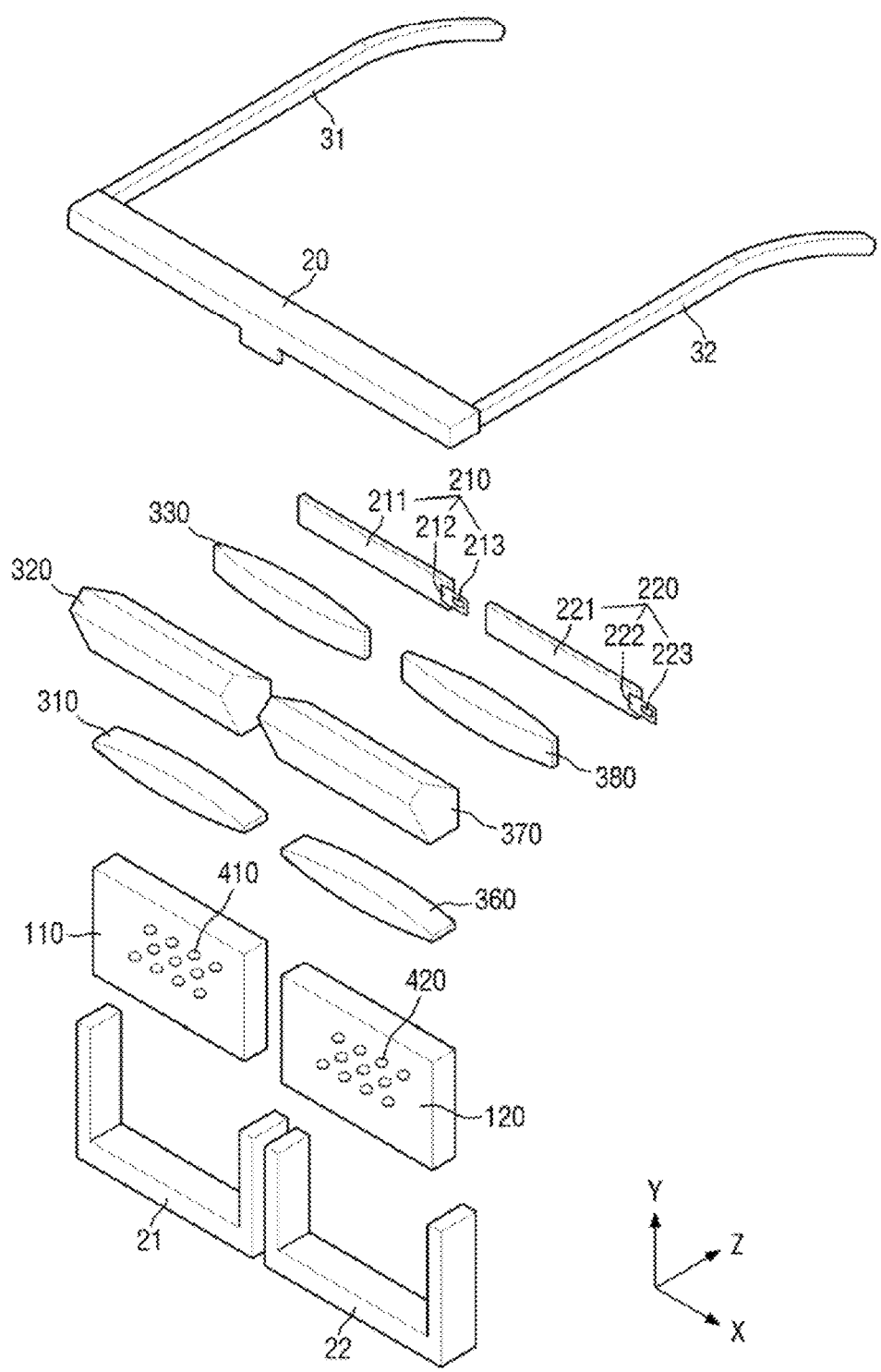
FIG. 2 is an exploded perspective view illustrating the optical device according to an exemplary embodiment of the present inventive concept.

FIG. 1 is a perspective view illustrating an optical device according to an exemplary embodiment of the present inventive concept. FIG. 2 is an exploded perspective view illustrating the optical device according to an exemplary embodiment of the present inventive concept.

Referring to FIGS. 1 and 2, an optical device 1 according to an exemplary embodiment of the present inventive concept includes a support frame 20, a right-eye lens rim 21, a left-eye lens rim 22, a first eyeglass frame leg 31, a second eyeglass frame leg 32, a right-eye lens 110, a left-eye lens 120, a first display device 210, a second display device 220, a first convex lens 310, a second convex lens 330, a third convex lens 360, a fourth convex lens 380, a first optical path converter 320, a second optical path converter 370, and reflectors 410 and 420.

In the present specification, "above", an "upper portion", "top", and an "upper surface", may refer to a "Z-axis direction", and a "lower portion", "bottom", and a "lower surface" may refer to a direction opposite to the Z-axis direction. In addition, "left" and "leftward" may refer to a direction opposite to an X-axis direction, "right" and "rightward" may refer to the X-axis direction, "up" and "upward" may refer to a Y-axis direction, and "down" and "downward" may refer to a direction opposite to the Y-axis direction.

The support frame 20 supports the right-eye lens 110 and the left-eye lens 120 together with the right-eye lens rim 21 and the left-eye lens rim 22. The right-eye lens 110 may be surrounded by the support frame 20 and the right-eye lens rim 21. The left-eye lens 120 may be surrounded by the support frame 20 and the left-eye lens rim 22.

The support frame 20 may be disposed on an upper side surface of the right-eye lens 110 and an upper side surface of the left-eye lens 120. The support frame 20 may extend lengthwise in a width direction (X-axis direction) of the right-eye lens 110.

The right-eye lens rim 21 may be disposed on a left side surface, a lower side surface, and a right side surface of the right-eye lens 110. The right-eye lens rim 21 may be coupled to the support frame 20. The left-eye lens rim 22 may be disposed on a left side surface, a lower side surface, and a right side surface of the left-eye lens 120. The left-eye lens rim 22 may be coupled to the support frame 20. Each of the right-eye lens rim 21 and the left-eye lens rim 22 may include a nose pad.

In FIG. 2, the support frame 20, the right-eye lens rim 21, and the left-eye lens rim 22 are illustrated as being formed separately and coupled to each other, but the present inventive concept is not limited thereto. The support frame 20, the right-eye lens rim 21, and the left-eye lens rim 22 may be integrally formed.

The first eyeglass frame leg 31 may be fixed to a left end of a lower side surface of the support frame 20. The second eyeglass frame leg 32 may be fixed to a right end of the lower side surface of the support frame 20. Each of the first eyeglass frame leg 31 and the second eyeglass frame leg 32 may be fixed to the support frame 20 using a fixing member such as a screw.

Each of the support frame 20, the right-eye lens rim 21, the left-eye lens rim 22, the first eyeglass frame leg 31, and the second eyeglass frame leg 32 may include plastic, metal, or both plastic and metal. The right-eye lens rim 21 and the left-eye lens rim 22 may be omitted.

Each of the right-eye lens 110 and the left-eye lens 120 may be formed to be transparent or translucent with glass or plastic. As a result, a user may see an image of the real world through the right-eye lens 110 and the left-eye lens 120. The right-eye lens 110 and the left-eye lens 120 may each have refractive power in consideration of a user's vision.

Each of the right-eye lens 110 and the left-eye lens 120 may have a hexahedral shape that includes a first surface, a second surface, and first, second, third and fourth side surfaces, each of which has a quadrangular shape. The first surface of the right-eye lens 110 is a surface facing a right eye RE of the user and may be an exit surface through which light from the first display device 210 is emitted by the reflectors 410 of the right-eye lens 110. The second surface of the right-eye lens 110 may be an outer surface of the right-eye lens 110. The first surface of the left-eye lens 120 is a surface facing a left eye LE of the user and may be an exit surface through which light from the second display device 220 is emitted by the reflectors 420 of the left-eye lens 120. The second surface of the left-eye lens 120 may be an outer surface of the left-eye lens 120.

Each of the right-eye lens 110 and the left-eye lens 120 is not limited to those illustrated in FIGS. 1 and 2 and may be formed in a polyhedron that includes a first surface, a second surface, and side surfaces, each of which has a polygonal shape other than a quadrangular shape. Further, each of the right-eye lens 110 and the left-eye lens 120 may be formed in other shapes such as a cylinder, an elliptic cylinder, a semi-cylinder, a semi-elliptic cylinder, a distorted cylinder, or a distorted semi-cylinder in addition to the polyhedron. The distorted cylinder and the distorted semi-cylinder respectively refer to a cylinder and a semi-cylinder whose diameter is not constant.

The reflectors 410 are disposed in the right-eye lens 110, and the reflectors 420 are disposed in the left-eye lens 120. Each of the reflectors 410 and 420 may include a small mirror such as a pin mirror. For example, each of the reflectors 410 and 420 may be smaller in size than the size of a pupil of the right eye RE or the left eye LE of the user. For example, when each of the reflectors 410 and 420 has a circular shape in a plan view, the maximum width of each of the reflectors 410 and 420 may be several tens to several hundred micrometers. Since the pupil of the user focuses on a real image, the user may not recognize the reflectors 410 and 420. In FIGS. 1 and 2, each of the reflectors 410 and 420 is illustrated as having a circular shape in a plan view but may have an elliptical-shaped or polygonal-shaped plane other than the circular-shaped plane.

The reflectors 410 of the right-eye lens 110 may reflect an image displayed on the first display device 210 to provide the reflected image to the right eye RE of the user. The reflectors 420 of the left-eye lens 120 may reflect an image displayed on the second display device 220 to provide the reflected image to the left eye LE of the user.

In FIGS. 1 and 2, it is illustrated that 11 reflectors 410 are arranged in the right-eye lens 110 and 11 reflectors 420 are arranged in the left-eye lens 120, but the number of reflectors 410 arranged in the right-eye lens 110 and the number of reflectors 420 arranged in the left-eye lens 120 are not limited thereto. For example, the number of reflectors 420 arranged in the right-eye lens 110 may be greater than or less than 11.

The first convex lens 310 may be disposed on one side surface of the right-eye lens 110, and the third convex lens 360 may be disposed on one side surface of the left-eye lens 120. The first convex lens 310 may be disposed on an upper side surface of the right-eye lens 110, and the third convex lens 360 may be disposed on an upper side surface of the left-eye lens 120. Each of the first convex lens 310 and the third convex lens 360 may be a planar convex lens or a biconvex lens.

The first optical path converter 320 may be disposed on the first convex lens 310, and the second optical path converter 370 may be disposed on the third convex lens 360. In this case, the first convex lens 310 may be disposed between the upper side surface of the right-eye lens 110 and the first optical path converter 320. Each of the first optical path converter 320 and the second optical path converter 370 may be a polyhedron that includes polygonal upper and lower surfaces. In FIG. 2, each of the first optical path converter 320 and the second optical path converter 370 is illustrated as being a pentaprism having the shape of a heptahedron having pentagonal upper and lower surfaces, but the present inventive concept is not limited thereto.

The second convex lens 330 may be disposed on one side surface of the first optical path convener 320, and the fourth convex lens 380 may be disposed on one side surface of the second optical path converter 370. For example, as illustrated in FIG. 2, the second convex lens 330 may be disposed on one side surface of the first optical path converter 320 in a thickness direction (Z-axis direction) of the right-eye lens 110. The fourth convex lens 380 may be disposed on one side surface of the second optical path converter 370 in a thickness direction (Z-axis direction) of the left-eye lens 120. Other than illustrated in FIG. 2, the first convex lens 310 may be disposed on the other side surface of the first optical path converter 320 in a height direction (Y-axis direction) of the right-eye lens 110. In addition, the third convex lens 360 may be disposed on the other side surface of the second optical path converter 370 in a height direction (Y-axis direction) of the left-eye lens 120. Each of the second convex lens 330 and the fourth convex lens 380 may be a planar convex lens or a biconvex lens.

Each of the first display device 210 and the second display device 220 displays a virtual image for implementing augmented reality. The first display device 210 may include a first display panel 211, a first circuit board 212, and a first driving circuit 213. The second display device 220 may include a second display panel 221, a second circuit board 222, and a second driving circuit 223.

The first display panel 211 may be disposed on the second convex lens 330 in the thickness direction (Z-axis direction) of the right-eye lens 110. The second display panel 221 may be disposed on the fourth convex lens 380 in the thickness direction (Z-axis direction) of the left-eye lens 120.

Figure 23:
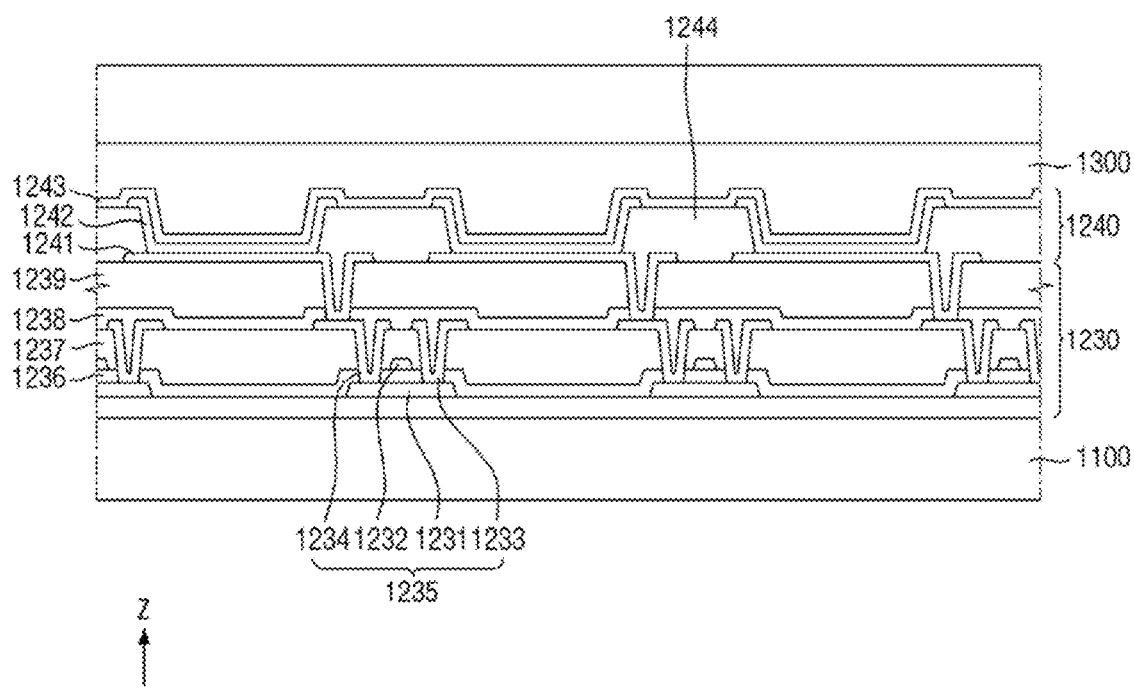
FIG. 23 is a cross-sectional view illustrating a first display area of a first display panel of FIG. 22 in detail.

Each of the first display panel 211 and the second display panel 221 may be a flexible display panel that has flexibility, and thus, may be curled, bent, or folded. For example, each of the first display panel 211 and the second display panel 221 may include an organic light-emitting display panel or an organic light-emitting display panel including quantum dots. In the present specification, it will be mainly described that each of the first display panel 211 and the second display panel 221 is an organic light-emitting display panel as illustrated in FIG. 23.

The first circuit board 212 may be attached to one end of the first display panel 211. The second circuit board 222 may be attached to one end of the second display panel 221. Each of the first circuit board 212 and the second circuit board 222 may be a flexible printed circuit board and thus may be curled, bent, or folded.

A power supply unit configured to supply power to the first display device 210 and the second display device 220 may be embedded in one of the first eyeglass frame leg 31 and the second eyeglass frame leg 32. In this case, a first cable configured to connect the first circuit board 212 to the power supply unit and a second cable configured to connect the second circuit board 222 to the power supply unit may be additionally provided. Here, when the power supply unit is embedded in the second eyeglass frame leg 32, the first cable may extend from the first eyeglass frame leg 31 to the second eyeglass frame leg 32. The length of the first cable may be greater than the length of the second cable.

Figure 3:
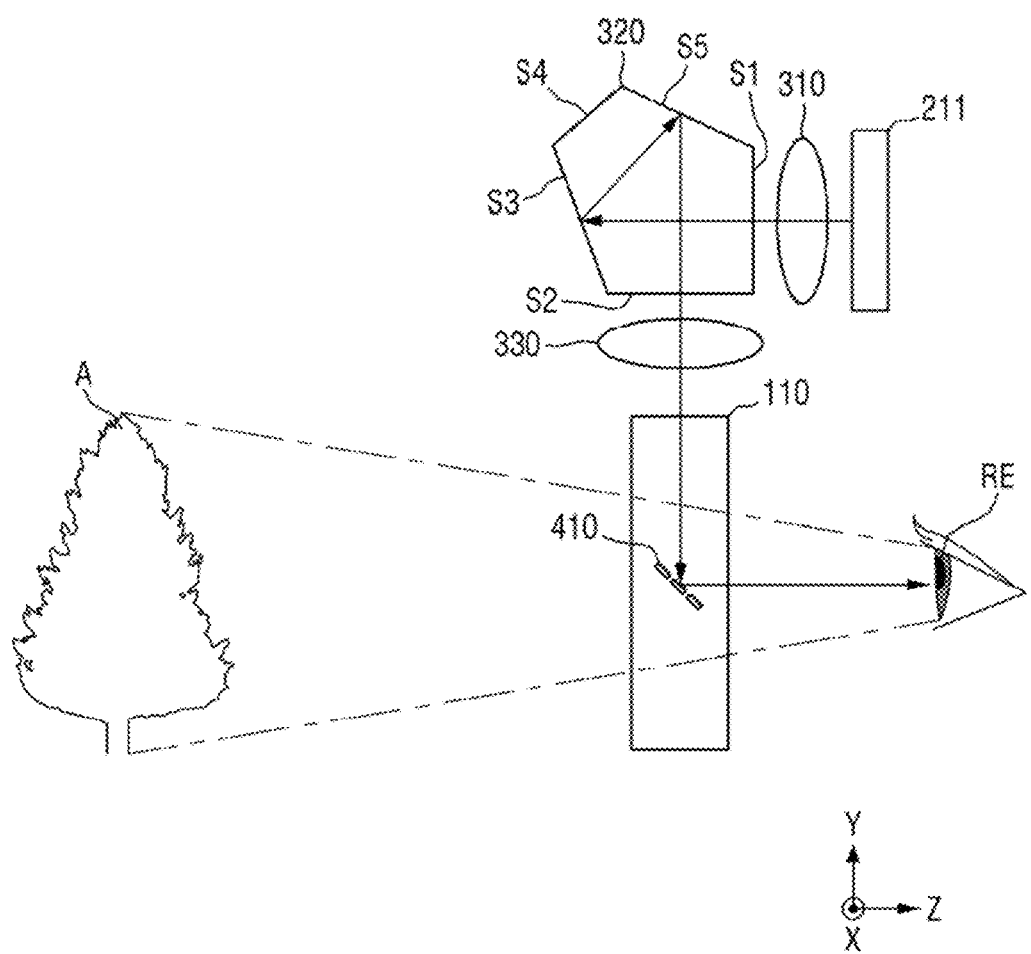
FIG. 3 is a view illustrating an augmented reality providing method in the optical device according to an exemplary embodiment of the present inventive concept.

FIG. 3 is a view illustrating an augmented reality providing method in the optical device according to an exemplary embodiment of the present inventive concept.

Referring to FIG. 3, the first optical path converter 320 may be a pentaprism as illustrated in FIG. 3. In this case, the first optical path converter 320 may include first, second, third, fourth and fifth side surfaces S1, S2, S3, S4 and S5. The first convex lens 310 may be disposed on the first side surface S1 of the first optical path converter 320, and the second convex lens 330 may be disposed on the second side surface S2 of the first optical path converter 320. An angle formed between the first side surface S1 and the second side surface S2 of the first optical path converter 320 may be a right angle. In the first optical path converter 320, the third side surface S3 may be a side surface that shares one side thereof with the first side surface S1, the fourth side surface S4 may be a side surface that shares one side thereof with the third side surface S3, and the fifth side surface S5 may be a side surface that shares one side thereof with the second side surface S2.

A virtual image IM, which is displayed on the first display panel 211, is collected by the first convex lens 310 and is incident on the first optical path converter 320. The virtual image IM, which is displayed on the first display panel 211, may be reflected from at least two side surfaces of the side surfaces (S1 to S5) of the first optical path converter 320. The number of virtual images IM, which are displayed on the first display panel 211, may increase due to the first optical path converter 320. As illustrated in FIG. 3, the virtual image IM, which is displayed on the first display panel 211, may be incident on the first side surface S1 of the first optical path converter 320, reflected from the third side surface S3 of the first optical path converter 320, reflected from the fifth side surface S5 of the first optical path converter 320, and then emitted to the second side surface S2 of the first optical path converter 320. Then, the virtual image IM, which is displayed on the first display panel 211, may be collected by the second convex lens 330 and incident on one side surface, for example, an upper side surface of the right-eye lens 110. Then, the virtual image IM, which is displayed on the first display panel 211, may be reflected from the reflectors 410 of the right-eye lens 110, may exit to an upper surface of the right-eye lens 110, and may be focused on a retina of the right eye RE of the user. Thus, the user may see an object A, which is a real image, together with the virtual image IM displayed on the first display panel 211 even when the user does not change his or her focus, which is on the object A, in other words, the real image.

Similar to that described with reference to FIG. 3, the virtual image IM displayed on the second display panel 221 may also be focused on a retina of the left eye LE of the user. Thus, the user may see the object A, which is the real image, together with the virtual image displayed on the second display panel 221 even when the user does not change his or her focus, which is on the object A, in other words, the real image.

Figure 4:
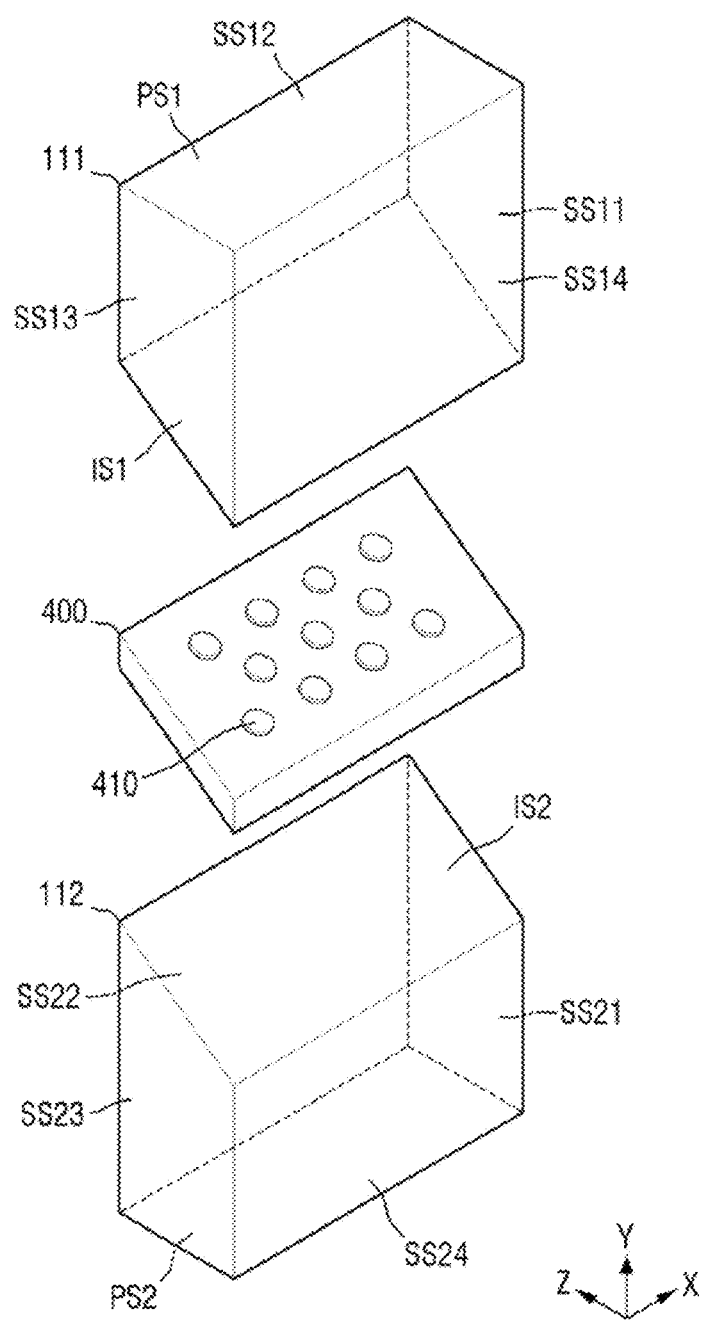
FIG. 4 is an exploded perspective view illustrating a right-eye lens and reflectors of FIGS. 1 to 3, according to an exemplary embodiment of the present inventive concept.
Figure 5:
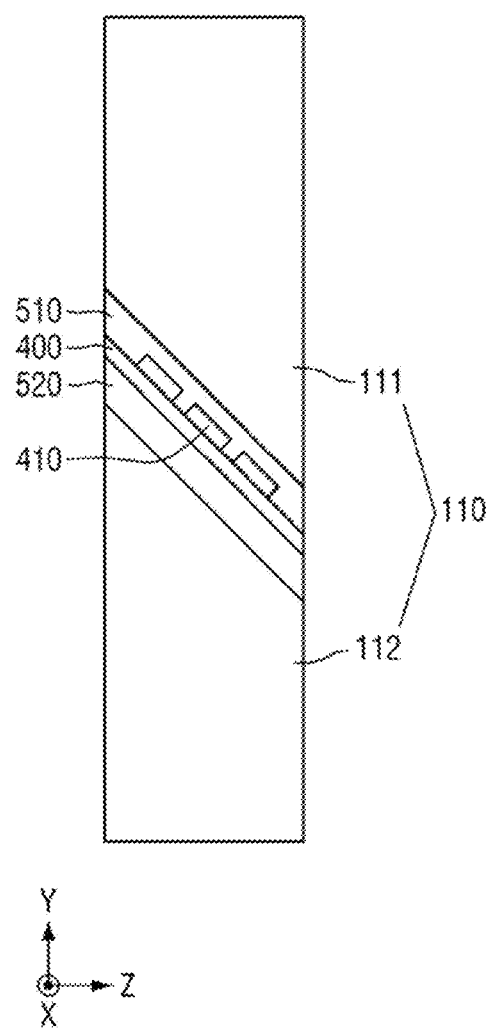
FIG. 5 is a side view illustrating an example of the right-eye lens and the reflectors of FIG. 4.

FIG. 4 is an exploded perspective view illustrating the right-eye lens and the reflectors of FIGS. 1 to 3, according to an exemplary embodiment of the present inventive concept. FIG. 5 is a side view illustrating an example of the right-eye lens and the reflectors of FIG. 4.

Referring to FIGS. 4 and 5, the right-eye lens 110 may include a first lens portion 111, a second lens portion 112, a reflector substrate 400, and the reflectors 410.

The first lens portion 111 may include a first inclined surface IS1, a first surface PS1, a second side surface SS12, and a fourth side surface SS14, each of which has a rectangular shape, and a first side surface SS11 and a third side surface SS13, each of which has a trapezoidal shape. The first inclined surface IS1 may be a lower surface of the first lens portion 111, and the first surface PS1 may be an upper surface of the first lens portion 111. The first side surface SS11 of the first lens portion 111 may be a left side surface of the first lens portion 111, the second side surface SS12 of the first lens portion 111 may be an upper side surface of the first lens portion 111, the third side surface SS13 of the first lens portion 111 may be a right side surface of the first lens portion 111, and the fourth side surface SS14 of the first lens portion 111 may be a lower side surface of the first lens portion 111. The first inclined surface IS1, the first surface PS1, the first side surface SS11, the second side surface SS12, the third side surface SS13, and the fourth side surface SS14 of the first lens portion 111 may be planar.

The second lens portion 112 may include a second inclined surface IS2, a second surface PS2, a second side surface SS22, and a fourth side surface SS24, each of which has a rectangular shape, and a first side surface SS21 and a third side surface SS23, each of which has a trapezoidal shape. The second inclined surface IS2 may be an upper surface of the second lens portion 112, and the second surface PS2 may be a lower surface of the second lens portion 112. The first side surface SS21 of the second lens portion 112 may be a left side surface of the second lens portion 112, the second side surface SS22 of the second lens portion 112 may be an upper side surface of the second lens portion 112, the third side surface SS23 of the second lens portion 112 may be a right side surface of the second lens portion 112, and the fourth side surface SS24 of the second lens portion 112 may be a lower side surface of the second lens portion 112. The second inclined surface IS2, the second surface PS2, the first side surface SS21, the second side surface SS22, the third side surface SS23, and the fourth side surface SS24 of the second lens portion 112 may be planar.

The first inclined surface IS1 of the first lens portion 111 may face the second inclined surface IS2 of the second lens portion 112. An inclined angle θ1 of the first inclined surface IS1 of the first lens portion 111 with respect to the second side surface SS12 of the first lens portion 111 may be substantially the same as an inclined angle θ2 of the second inclined surface IS2 of the second lens portion 112 with respect to the fourth side surface SS24 of the second side surface SS12. The first inclined surface IS1 of the first lens portion 111 may be parallel to the second inclined surface IS2 of the second lens portion 112.

The reflector substrate 400 may be disposed between the first inclined surface IS1 of the first lens portion 111 and the second inclined surface IS2 of the second lens portion 112. The reflector substrate 400 may be formed to be transparent or translucent with glass or plastic. For example, the reflector substrate 400 may be an ultra-thin glass of 0.1 mm or less or a flexible film such as a polyimide film.

The reflectors 410 may be disposed on a first surface of the reflector substrate 400. The first surface of the reflector substrate 400 may face the first inclined surface IS1 of the first lens portion 111. A second surface of the reflector substrate 400, which is a surface opposite to the first surface of the reflector substrate 400, may face the second inclined surface IS2 of the second lens portion 112.

Each of the reflectors 410 may be formed by depositing a metal having high reflectance such as silver (Ag) on the first surface of the reflector substrate 400. Each of the reflectors 410 may have a thin thickness of several to several tens of micrometers.

A first adhesive layer 510 is disposed between the first inclined surface IS1 of the first lens portion 111 and the first surface of the reflector substrate 400, and the first surface of the reflector substrate 400 is adhered to the first inclined surface IS1 of the first lens portion 111. A second adhesive layer 520 is disposed between the second inclined surface IS2 of the second lens portion 112 and the second surface of the reflector substrate 400, and the second surface of the reflector substrate 400 is adhered to the second inclined surface IS2 of the second lens portion 112. The first adhesive layer 510 and the second adhesive layer 520 may include an optically clear resin (OCR) or an optically clear adhesive (OCA).

A refractive index of the first lens portion 111 may be substantially the same as a refractive index of the second lens portion 112. A refractive index of the first adhesive layer 510 may match the refractive index of the first lens portion 111 and the refractive index of the second lens portion 112. In this case, the light from the first display device 210, which is provided on the right-eye lens 110, is minimally affected by refraction, reflection, and the like by the first adhesive layer 510 and the second adhesive layer 520. Thus, the refractive index of the first adhesive layer 510 and the refractive index of the second adhesive layer 520 may be substantially the same as the refractive index of the first lens portion 111 and the refractive index of the second lens portion 112, respectively. Alternatively, the difference between the refractive index of the first adhesive layer 510 and the refractive index of the first lens portion 111, and the difference between the refractive index of the first adhesive layer 510 and the refractive index of the second lens portion 112 may be 0.1 or less. In addition, the difference between the refractive index of the second adhesive layer 520 and the refractive index of the first lens portion 111, and the difference between the refractive index of the second adhesive layer 520 and the refractive index of the second lens portion 112 may be 0.1 or less.

Referring to the exemplary embodiment illustrated in FIGS. 4 and 5, the reflector substrate 400, on which the reflectors 410 are deposited, is attached to the first inclined surface IS1 of the first lens portion 111 of the right-eye lens 110 using the first adhesive layer 510 and is attached to the second inclined surface IS2 of the second lens portion 112 of the right-eye lens 110 using the second adhesive layer 520. Thus, the right-eye lens 110, which includes the reflectors 410 inclined by a third angle θ3 in the height direction (Y-axis direction) of the right-eye lens 110 relative to the width direction (Z-axis direction) of the right-eye lens 110, may be easily manufactured.

The left-eye lens 120 may be formed to be substantially the same as the right-eye lens 110 illustrated in FIGS. 4 and 5, and thus, detailed descriptions of the left-eye lens 120 are omitted.

Figure 6:
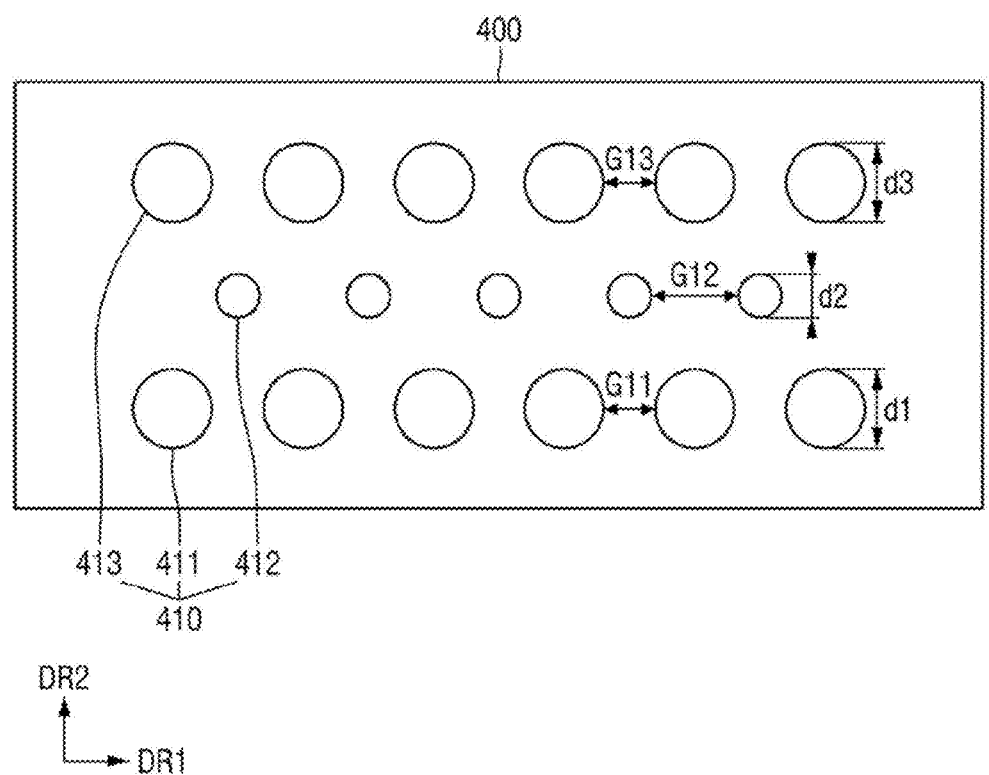
FIG. 6 is a plan view illustrating an example of reflectors of a reflector substrate of FIGS. 4 and 5.

FIG. 6 is a plan view illustrating an example of reflectors of the reflector substrate of FIGS. 4 and 5.

Referring to FIG. 6, reflectors 410 are disposed on the first surface of the reflector substrate 400. The reflectors 410 may include first reflectors 411, second reflectors 412, and third reflectors 413. Each of the first reflectors 411, the second reflectors 412, and the third reflectors 413 may have a circular or elliptical shape in a plan view.

The first reflectors 411 may be arranged in a first direction DR1 that is a width direction of the reflector substrate 400. The first direction DR1 may be substantially the same as the width direction (X-axis direction) of the right-eye lens 110 (or the width direction (X-axis direction) of the left-eye lens 120). Gaps between the first reflectors 411 in the first direction DR1 may be equal to each other. In the alternative, gaps between the first reflectors 411 in the first direction DR1 may not be equal to each other. The first reflectors 411 may be adjacent to a first side of the reflector substrate 400 in a second direction DR2. For example, as illustrated in FIG. 6, the first reflectors 411 may be adjacent to a lower side of the reflector substrate 400.

The second reflectors 412 may be arranged in the first direction DR1. Gaps between the second reflectors 412 in the first direction DR1 may be equal to each other. In the alternative, gaps between the second reflectors 412 in the first direction DR1 may not be equal to each other. The second reflectors 412 may be disposed at a center of the reflector substrate 400 in the second direction DR2. The second reflectors 412 may be disposed at positions farther from the first side of the reflector substrate 400 than the first reflectors 411. In other words, the second reflectors 412 are farther from the first side of the reflector substrate 400, which extends lengthwise in the first direction DR1, than the first reflectors 411 in the second direction DR2 perpendicular to the first direction DR1. For example, as illustrated in FIG. 6, the second reflectors 412 may be disposed at positions farther from the lower side of the reflector substrate 400 than the first reflectors 411. The lower side of the reflector substrate 400 is adjacent to the first surface of the right-eye lens 110, and thus, the second reflectors 412 may be disposed at positions farther from the first surface of the right-eye lens 110 than the first reflectors 411.

The third reflectors 413 may be arranged in the first direction DR1. Gaps between the third reflectors 413 in the first direction DR1 may be equal to each other. In the alternative, gaps between the third reflectors 413 in the first direction DR1 may not be equal to each other. The third reflectors 413 may be adjacent to a second side of the reflector substrate 400 in the second direction DR2. For example, as illustrated in FIG. 6, the third reflectors 413 may be adjacent to an upper side of the reflector substrate 400. The third reflectors 413 may be disposed at positions farther from the first side of the reflector substrate 400 than the second reflectors 412. In other words, the second reflectors 412 are farther from the first side of the reflector substrate 400, which extends lengthwise in the first direction DR1, than the third reflectors 413 in the second direction DR2 perpendicular to the first direction DR1. For example, as illustrated in FIG. 6, the third reflectors 413 may be disposed at positions farther from the lower side of the reflector substrate 400 than the second reflectors 412. The lower side of the reflector substrate 400 is adjacent to the first surface of the right-eye lens 110, and thus, the third reflectors 413 may be disposed at positions farther from the first surface of the right-eye lens 110 than the second reflectors 412. In addition, the third reflectors 413 may be disposed at positions closer to the second side of the reflector substrate 400 than the second reflectors 412. For example, as illustrated in FIG. 6, the third reflectors 413 may be disposed at positions closer to the upper side of the reflector substrate 400 than the second reflectors 412. The upper side of the reflector substrate 400 is adjacent to the second surface of the right-eye lens 110, and thus, the third reflectors 413 may be disposed at positions closer to the second surface of the right-eye lens 110 than the second reflectors 412.

A minimum distance G11 between the first reflectors 411 adjacent to each other may be smaller than a minimum distance G12 between the second reflectors 412 adjacent to each other. A minimum distance G13 between the third reflectors 413 adjacent to each other may be smaller than the minimum distance G12 between the second reflectors 412 adjacent to each other. The minimum distance G11 between the first reflectors 411 adjacent to each other may be substantially equal to the minimum distance G13 between the third reflectors 413 adjacent to each other.

One of the first reflectors 411 may overlap one of the third reflectors 413 in the second direction DR2. As illustrated in FIG. 6, each of the second reflectors 412 may not overlap the first reflectors 411 and the third reflectors 413 in the second direction DR2, but the present inventive concept is not limited thereto. Each of the second reflectors 412 may overlap one of the first reflectors 411 and/or one of the third reflectors 413 in the second direction DR2.

In a plan view, a size of each of the first reflectors 411 may be greater than a size of each of the second reflectors 412. In a plan view, a size of each of the third reflectors 413 may be greater than the size of each of the second reflectors 412.

In a plan view, the size of each of the first reflectors 411 may be substantially equal to the size of each of the third reflectors 413.

When each of the first reflectors 411, the second reflectors 412, and the third reflectors 413 has a circular shape in a plan view, a diameter d1 of each of the first reflectors 411 may be greater than a diameter d2 of each of the second reflectors 412. A diameter d3 of each of the third reflectors 413 may be greater than the diameter d2 of each of the second reflectors 412. The diameter d1 of each of the first reflectors 411 may be substantially equal to the diameter d3 of each of the third reflectors 413.

Figure 7:
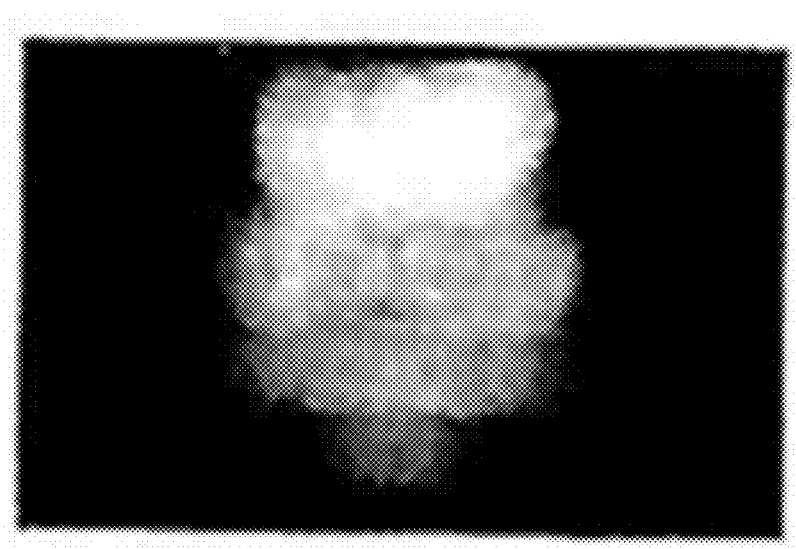
FIGS. 7, 8, 9, 10, 11 and 12 are views each illustrating a virtual image that is shown to a user according to the size of a reflector, according to an exemplary embodiment of the present inventive concept.
Figure 8:
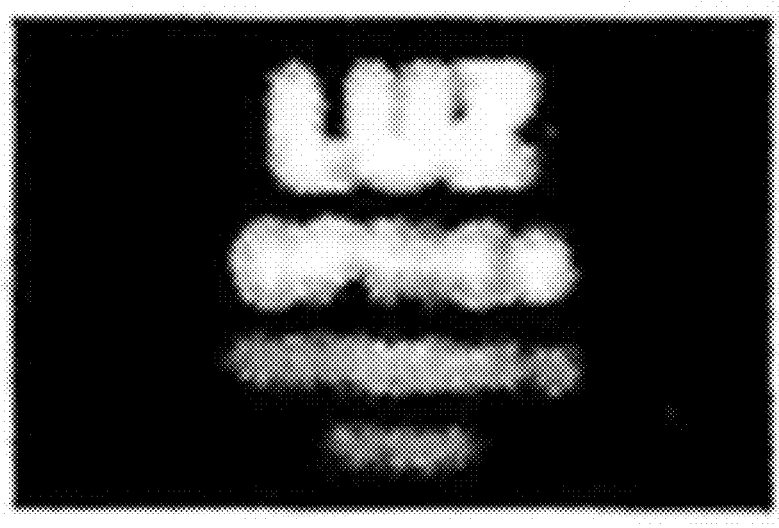
Figure 9:
Figure 10:
Figure 11:
Figure 12:

FIGS. 7 to 12 illustrate virtual images IM of the first display device 210, which are shown according to the size of the reflector 410, according to an exemplary embodiment of the present inventive concept. When the diameter of the reflector 410 is 2 millimeters, the virtual image IM is shown blurred as illustrated in FIG. 7. When the diameter of the reflector 410 is 1 millimeter, the virtual image IM is still shown blurred as illustrated in FIG. 8, but is clearer than that of FIG. 7. When the diameter of the reflector 410 is 600 μm, as illustrated in FIG. 9, the virtual image IM is clearer than that of FIG. 8. When the diameter of the reflector 410 is 350 μm, as illustrated in FIG. 10, the virtual image IM is clearer than that of FIG. 9. When the diameter of the reflector 410 is 150 μm, as illustrated in FIG. 11, the virtual image IM is dimmer than that of FIG. 10. When the diameter of the reflector 410 is 70 μm, as illustrated in FIG. 12, the virtual image IM is dimmer than that of FIG. 11.

As illustrated in FIGS. 7 to 12, when the diameter of the reflector 410 is 350 μm, the virtual image IM is clearly shown, but the virtual image IM has the lowest luminance. In other words, the higher the sharpness of the virtual image IM shown, the lower the luminance of the virtual image IM. In addition, the blurrier the virtual image IM shown, the higher the luminance of the virtual image IM.

As illustrated in FIG. 6, in a plan view, when the size of each of the first reflectors 411 and the size of each of the third reflectors 413 are greater than the size of each of the second reflectors 412, the sharpness of the virtual image IM, which is reflected from the second reflectors 412 and shown to the user, is higher than the sharpness of the virtual image IM that is reflected from the first reflectors 411 and the third reflectors 413 and shown to the user. However, the luminance of the virtual image IM, which is reflected from each of the first reflectors 411 and the third reflectors 413 and shown to the user, may be higher than the luminance of the virtual image IM that is reflected from the second reflectors 412 and shown to the user.

According to the exemplary embodiment illustrated in FIG. 6, the sharpness of the virtual image IM shown to the user may be increased by reflecting the light of the first display device 210 from the second reflectors 412, and at the same time, the luminance of the virtual image IM shown to the user may be increased by reflecting the light of the first display device 210 from the first reflectors 411 and the third reflectors 413.

Further, since the first reflectors 411 are disposed on the lower side of the reflector substrate 400 and the third reflectors 413 are disposed on the upper side of the reflector substrate 400, the luminance of the virtual image IM at the upper side and the lower side of the reflector substrate 400 may be reduced or prevented from being lower than the luminance of the virtual image IM at the center of the reflector substrate 400.

Figure 13:
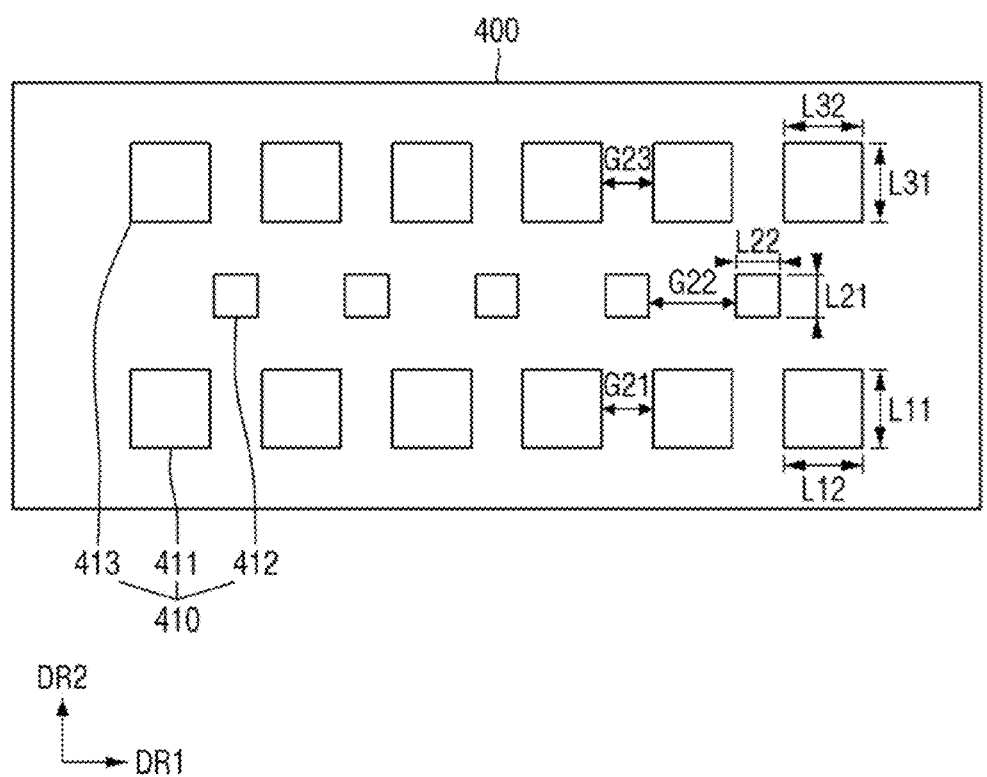
FIG. 13 is a plan view illustrating an example of reflectors of the reflector substrate of FIGS. 4 and 5.

FIG. 13 is a plan view illustrating an example of reflectors of the reflector substrate of FIGS. 4 and 5.

The exemplary embodiment illustrated in FIG. 13 is different from the exemplary embodiment illustrated in FIG. 6 in that first reflectors 411, second reflectors 412, and third reflectors 413 have in a quadrangular shape instead of a circular shape or elliptical shape in a plan view. FIG. 13 will be described focusing on differences from the exemplary embodiment illustrated in FIG. 6.

Referring to FIG. 13, a minimum distance G21 between the first reflectors 411 adjacent to each other may be smaller than a minimum distance G22 between the second reflectors 412 adjacent to each other. A minimum distance G23 between the third reflectors 413 adjacent to each other may be smaller than the minimum distance G22 between the second reflectors 412 adjacent to each other. The minimum distance G21 between the first reflectors 411 adjacent to each other may be substantially equal to the minimum distance G23 between the third reflectors 413 adjacent to each other.

In a plan view, a size of each of the first reflectors 411 may be greater than a size of each of the second reflectors 412. In a plan view, a size of each of the third reflectors 413 may be greater than the size of each of the second reflectors 412. In a plan view, the size of each of the first reflectors 411 may be substantially equal to the size of each of the third reflectors 413.

When each of the first reflectors 411, the second reflectors 412, and the third reflectors 413 has a rectangular shape in a plan view, a length L11 of each of the first reflectors 411 in the second direction DR2 and a length L12 of each of the first reflectors 411 in the first direction DR1 may be greater than a length L21 of each of the second reflectors 412 in the second direction DR2 and a length L22 of each of the second reflectors 412 in the first direction DR1. A length L31 of each of the third reflectors 413 in the second direction DR2 and a length L32 of each of the third reflectors 413 in the first direction DR1 may be greater than the length L21 of each of the second reflectors 412 in the second direction DR2 and the length L22 of each of the second reflectors 412 in the first direction DR1. The length L11 of each of the first reflectors 411 in the second direction DR2 and the length L12 of each of the first reflectors 411 in the first direction DR1 may be substantially equal to the length L31 of each of the third reflectors 413 in the second direction DR2 and the length L32 of each of the third reflectors 413 in the first direction DR1.

In addition, when each of the first reflectors 411, the second reflectors 412, and the third reflectors 413 has a square shape in a plan view, the length L11 of each of the first reflectors 411 in the second direction DR2 may be substantially equal to the length L12 of the first reflectors 411 in the first direction DR1. The length L21 of each of the second reflectors 412 in the second direction DR2 may be substantially equal to the length L22 of each of the second reflectors 412 in the first direction DR1. The length L31 of each of the third reflectors 413 in the second direction DR2 may be substantially equal to the length L32 of each of the third reflectors 413 in the first direction DR1.

As illustrated in FIG. 13, in a plan view, when a size of each of the first reflectors 411 and a size of each of the third reflectors 413 are greater than a size of each of the second reflectors 412, the sharpness of the virtual image IM, which is reflected from the second reflectors 412 and shown to the user, is higher than the sharpness of the virtual image IM that is reflected from the first reflectors 411 and the third reflectors 413 and shown to the user. However, the luminance of the virtual image IM, which is reflected from the first reflectors 411 and the third reflectors 413 and shown to the user, may be higher than the luminance of the virtual image IM that is reflected from the second reflectors 412 and shown to the user.

According to the exemplary embodiment illustrated in FIG. 13, the sharpness of the virtual image IM shown to the user may be increased by reflecting the light of the first display device 210 from the second reflectors 412, and at the same time, the luminance of the virtual image IM shown to the user may be increased by reflecting the light of the first display device 210 from the first reflectors 411 and the third reflectors 413.

Further, since the first reflectors 411 are disposed on a lower side of the reflector substrate 400 and the third reflectors 413 are disposed on an upper side of the reflector substrate 400, the luminance of the virtual image IM at the upper side and the lower side of the reflector substrate 400 may be reduced or prevented from being lower than the luminance of the virtual image IM at a center of the reflector substrate 400.

Figure 14:
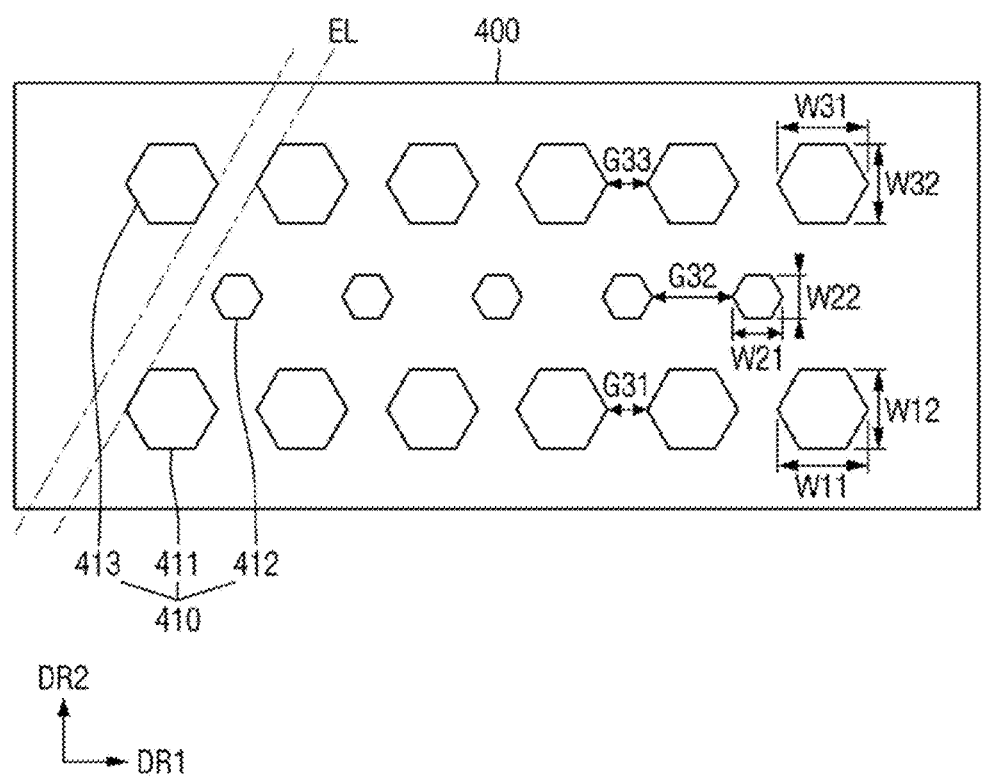
FIG. 14 is a plan view illustrating an example of reflectors of the reflector substrate of FIGS. 4 and 5.

FIG. 14 is a plan view illustrating an example of reflectors of the reflector substrate of FIGS. 4 and 5.

The exemplary embodiment illustrated in FIG. 14 is different from the exemplary embodiment illustrated in FIG. 6 in that first reflectors 411, second reflectors 412, and third reflectors 413 have a hexagonal shape instead of a circular shape or elliptical shape in a plan view. FIG. 14 will be described focusing on differences from the exemplary embodiment illustrated in FIG. 6.

Referring to FIG. 14, a minimum distance G31 between the first reflectors 411 adjacent to each other may be smaller than a minimum distance G32 between the second reflectors 412 adjacent to each other. A minimum distance G33 between the third reflectors 413 adjacent to each other may be smaller than the minimum distance G32 between the second reflectors 412 adjacent to each other. The minimum distance G31 between the first reflectors 411 adjacent to each other may be substantially equal to the minimum distance G33 between the third reflectors 413 adjacent to each other.

When each of the first reflectors 411, the second reflectors 412, and the third reflectors 413 has a hexagonal shape in a plan view, one side of one first reflector 411 of the first reflectors 411 may be parallel to one side of one second reflector 412 of the second reflectors 412 and one side of one third reflector 413 of the third reflectors 413. In this case, a region in which an image, which is reflected from the one second reflector 412 of the second reflectors 412 and shown, overlaps an image, which is reflected from the one first reflector 411 of the first reflectors 411 and shown, may be minimized, or a region of a gap between the image, which is reflected from the one second reflector 412 and shown, and the image, which is reflected from the one first reflector 411 and shown, may be minimized.

In FIG. 14, each of the first reflectors 411, the second reflectors 412, and the third reflectors 413 is illustrated as having a hexagonal shape in a plan view, but the present inventive concept is not limited thereto. For example, when each of the first reflectors 411, the second reflectors 412, and the third reflectors 413 has a rhombus shape in a plan view, one side of one first reflector 411 of the first reflectors 411 may be parallel to one side of one second reflector 412 of the second reflectors 412 and one side of one third reflector 413 of the third reflectors 413. Also in this case, a region in which an image, which is reflected from the one second reflector 412 of the second reflectors 412 and shown, overlaps an image, which is reflected from the one first reflector 411 of the first reflectors 411 and shown, may be minimized, or a region of a gap between the image, which is reflected from the one second reflector 412 and shown, and the image, which is reflected from the one first reflector 411 and shown, may be minimized.

In addition, an extension line EL of one side of any first reflector 411 of the first reflectors 411 may meet one side of any third reflector 413 of the third reflectors 413. In other words, a straight line may extend along a side of one of the first reflectors 411 to a side of one of the third reflectors 413.

In a plan view, a size of each of the first reflectors 411 may be greater than a size of each of the second reflectors 412. In a plan view, a size of each of the third reflectors 413 may be greater than the size of each of the second reflectors 412. In a plan view, the size of each of the first reflectors 411 may be substantially equal to the size of each of the third reflectors 413.

When each of the first reflectors 411, the second reflectors 412, and the third reflectors 413 has a hexagonal shape in a plan view, a width W11 of each of the first reflectors 411 in the first direction DR1 may be greater than a width W21 of each of the second reflectors 412 in the first direction DR1, and a width W12 of each of the first reflectors 411 in the second direction DR2 may be greater than a width W22 of each of the second reflectors 412 in the second direction DR2. A width W31 of each of the third reflectors 413 in the first direction DR1 may be greater than the width W21 of each of the second reflectors 412 in the first direction DR1, and a width W32 of each of the third reflectors 413 in the second direction DR2 may be greater than the width W22 of each of the second reflectors 412 in the second direction DR2. The width W11 of each of the first reflectors 411 in the first direction DR1 may be substantially equal to the width W31 of each of the third reflectors 413 in the first direction DR1, and the width W12 of each of the first reflectors 411 in the second direction DR2 may be substantially equal to the width W32 of each of the third reflectors 413 in the second direction DR2.

As illustrated in FIG. 14, in a plan view, when the size of each of the first reflectors 411 and the size of each of the third reflectors 413 are greater than the size of each of the second reflectors 412, the sharpness of the virtual image IM, which is reflected from the second reflectors 412 and shown to the user, is higher than the sharpness of the virtual image IM that is reflected from the first reflectors 411 and the third reflectors 413 and shown to the user. However, the luminance of the virtual image IM, which is reflected from the first reflectors 411 and the third reflectors 413 and shown to the user, may be higher than the luminance of the virtual image IM that is reflected from the second reflectors 412 and shown to the user.

According to the exemplary embodiment illustrated in FIG. 14, the sharpness of the virtual image IM shown to the user may be increased by reflecting the light of the first display device 210 from the second reflectors 412, and at the same time, the luminance of the virtual image IM shown to the user may be increased by reflecting the light of the first display device 210 from the first reflectors 411 and the third reflectors 413.

Further, since the first reflectors 411 are disposed on a lower side of the reflector substrate 400 and the third reflectors 413 are disposed on an upper side of the reflector substrate 400, the luminance of the virtual image IM at the upper side and the lower side of the reflector substrate 400 may be reduced or prevented from being lower than the luminance of the virtual image IM at a center of the reflector substrate 400.

Figure 15:
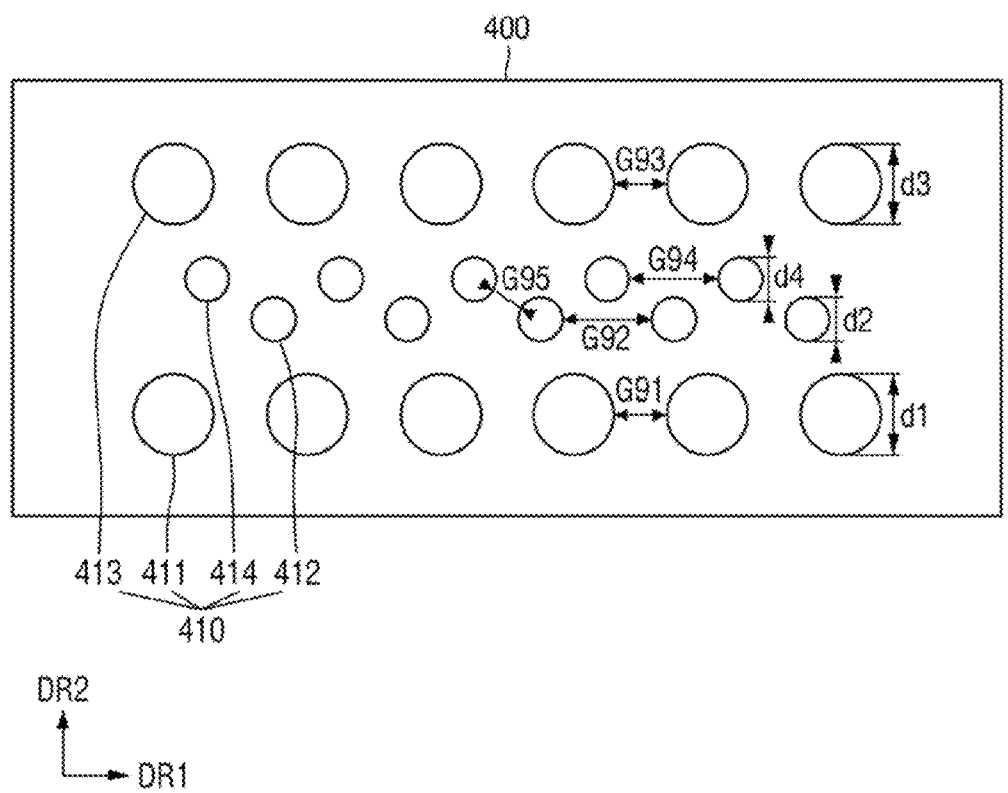
FIG. 15 is a plan view illustrating an example of reflectors of the reflector substrate of FIGS. 4 and 5.

FIG. 15 is a plan view illustrating an example of reflectors of the reflector substrate of FIGS. 4 and 5.

The exemplary embodiment illustrated in FIG. 15 is different from the exemplary embodiment illustrated in FIG. 6 in that fourth reflectors 414 are additionally provided. FIG. 15 will be described focusing on differences from the exemplary embodiment illustrated in FIG. 6.

Referring to FIG. 15, the fourth reflectors 414 may be arranged in the first direction DR1. Second reflectors 412 and the fourth reflectors 414 may be disposed at a center of the reflector substrate 400 in the second direction DR2. Gaps between the fourth reflectors 414 in the first direction DR1 may be equal to each other. In the alternative, gaps between the fourth reflectors 414 in the first direction DR1 may not be equal to each other. The fourth reflectors 414 may be disposed at positions farther from a first side of the reflector substrate 400 than the second reflectors 412. For example, as illustrated in FIG. 15, the fourth reflectors 414 may be disposed at positions farther from a lower side of the reflector substrate 400 than the second reflectors 412. The lower side of the reflector substrate 400 is adjacent to the first surface of the right-eye lens 110, and thus, the fourth reflectors 414 may be disposed at positions farther from the first surface of the right-eye lens 110 than the second reflectors 412. In addition, the fourth reflectors 414 may be disposed at positions farther from a second side of the reflector substrate 400 than third reflectors 413. For example, as illustrated in FIG. 15, the fourth reflectors 414 may be disposed at positions farther from an upper side of the reflector substrate 400 than the third reflectors 413. The upper side of the reflector substrate 400 is adjacent to the second surface of the right-eye lens 110, and thus, the fourth reflectors 414 may be disposed at positions farther from the second surface of the right-eye lens 110 than the third reflectors 413.

A minimum distance G91 between the first reflectors 411 adjacent to each other may be smaller than a minimum distance G92 between the second reflectors 412 adjacent to each other. A minimum distance G93 between the third reflectors 413 adjacent to each other may be smaller than the minimum distance G92 between the second reflectors 412 adjacent to each other. The minimum distance G91 between the first reflectors 411 adjacent to each other may be smaller than a minimum distance G94 between the fourth reflectors 414 adjacent to each other. The minimum distance G93 between the third reflectors 413 adjacent to each other may be smaller than the minimum distance G94 between the fourth reflectors 414 adjacent to each other. A minimum distance G95 between the second reflector 412 and the fourth reflector 414, which are adjacent to each other, may be smaller than the minimum distance G91 between the first reflectors 411 adjacent to each other, the minimum distance G92 between the second reflectors 412 adjacent to each other, the minimum distance G93 between the third reflectors 413 adjacent to each other, and the minimum distance G94 between the fourth reflectors 414 adjacent to each other. The minimum distance G91 between the first reflectors 411 adjacent to each other may be substantially equal to the minimum distance G93 between the third reflectors 413 adjacent to each other. The minimum distance G92 between the second reflectors 412 adjacent to each other may be substantially equal to the minimum distance G94 between the fourth reflectors 414 adjacent to each other.

In a plan view, a size of each of the first reflectors 411 may be greater than a size of each of the second reflectors 412. In a plan view, a size of each of the third reflectors 413 may be greater than the size of each of the second reflectors 412. In a plan view, the size of each of the first reflectors 411 may be greater than a size of each of the fourth reflectors 414. In a plan view, the size of each of the third reflectors 413 may be greater than the size of each of the fourth reflectors 414. In a plan view, the size of each of the first reflectors 411 may be substantially equal to the size of each of the third reflectors 413. In a plan view, the size of each of the second reflectors 412 may be substantially equal to the size of each of the fourth reflectors 414. In a plan view, the second and fourth reflectors 412 and 414 may be alternately arranged in a row along the first direction DR1 between rows of the first reflectors 411 and the third reflectors 413 arranged in the first direction DR1.

When each of the first reflectors 411, the second reflectors 412, and the third reflectors 413 has a circular shape in a plan view, a diameter d1 of each of the first reflectors 411 may be greater than a diameter d2 of each of the second reflectors 412. A diameter d3 of each of the third reflectors 413 may be greater than the diameter d2 of each of the second reflectors 412. The diameter d1 of each of the first reflectors 411 may be greater than a diameter d4 of each of the fourth reflectors 414. The diameter d3 of each of the third reflectors 413 may be greater than the diameter d4 of each of the fourth reflectors 414. The diameter d1 of each of the first reflectors 411 may be substantially equal to the diameter d3 of each of the third reflectors 413. The diameter d2 of each of the second reflectors 412 may be substantially equal to the diameter d4 of each of the fourth reflectors 414.

As illustrated in FIG. 15, in a plan view, when the size of each of the first reflectors 411 and the size of each of the third reflectors 413 are greater than the size of each of the second reflectors 412 and the size of each of the fourth reflectors 414, the sharpness of the virtual image IM, which is reflected from the second reflectors 412 and the fourth reflectors 414 and shown to the user, is higher than the sharpness of the virtual image IM that is reflected from the first reflectors 411 and the third reflectors 413 and shown to the user. However, the luminance of the virtual image IM, which is reflected from the first reflectors 411 and the third reflectors 413 and shown to the user, may be higher than the luminance of the virtual image IM that is reflected from the second reflectors 412 and the fourth reflectors 414 and shown to the user.

According to the exemplary embodiment illustrated in FIG. 15, the sharpness of the virtual image IM shown to the user may be increased by reflecting the light of the first display device 210 from the second reflectors 412 and the fourth reflectors 414, and at the same time, the luminance of the virtual image IM shown to the user may be increased by reflecting the light of the first display device 210 from the first reflectors 411 and the third reflectors 413.

Further, since the first reflectors 411 are disposed on a lower side of the reflector substrate 400 and the third reflectors 413 are disposed on an upper side of the reflector substrate 400, the luminance of the virtual image IM at the upper side and the lower side of the reflector substrate 400 may be reduced or prevented from being lower than the luminance of the virtual image IM at a center of the reflector substrate 400.

Figure 16:
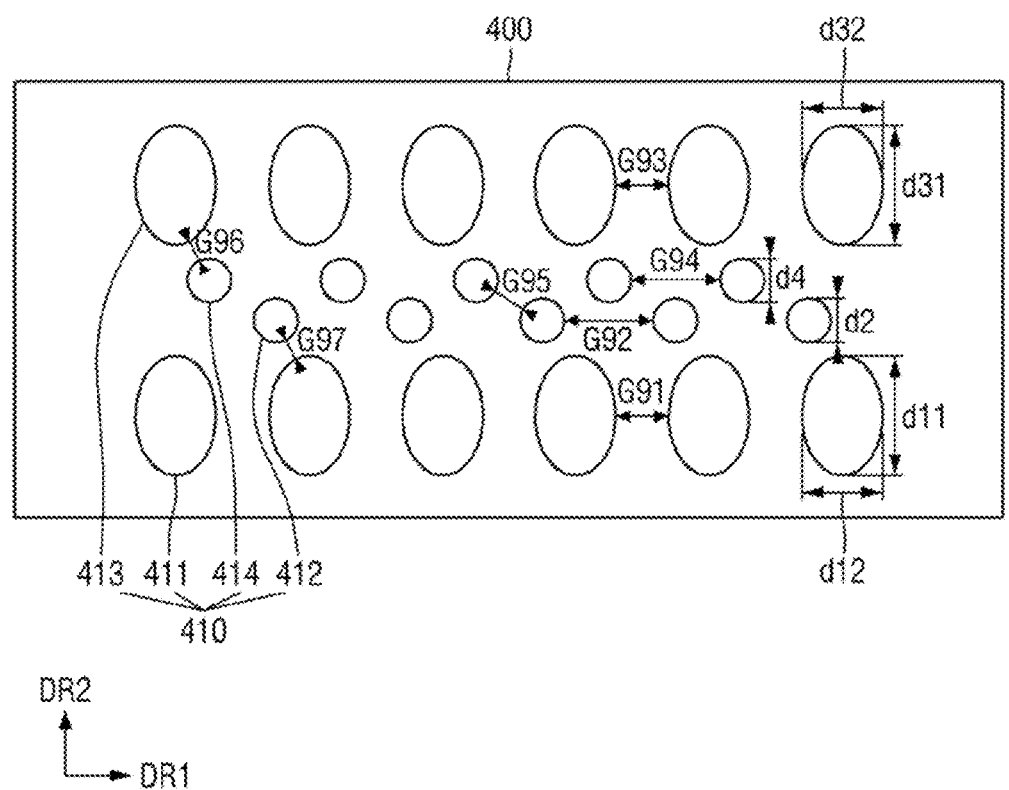
FIG. 16 is a plan view illustrating an example of reflectors of the reflector substrate of FIGS. 4 and 5.

FIG. 16 is a plan view illustrating an example of reflectors of the reflector substrate of FIGS. 4 and 5.

The exemplary embodiment illustrated in FIG. 16 is different from the exemplary embodiment illustrated in FIG. 15 in that first reflectors 411 and third reflectors 413 have an elliptical shape. FIG. 16 will be described focusing on differences from the exemplary embodiment illustrated in FIG. 15.

Referring to FIG. 16, a minimum distance G96 between a third reflector 413 and a fourth reflector 414, which are adjacent to each other, and a minimum distance G97 between a first reflector 411 and a second reflector 412, which are adjacent to each other, may be smaller than a minimum distance G91 between the first reflectors 411 adjacent to each other, a minimum distance G92 between the second reflectors 412 adjacent to each other, a minimum distance G93 between the third reflectors 413 adjacent to each other, and a minimum distance G94 between the fourth reflectors 414 adjacent to each other.

In addition, in FIG. 16, the first reflectors 411 and the third reflectors 413 have an elliptical shape, and the second reflectors 412 and the fourth reflectors 414 have a circular shape, but the present inventive concept is not limited thereto. All of the first reflectors 411, the second reflectors 412, and the third reflectors 413, and the fourth reflectors 414 may have an elliptical shape.

According to the exemplary embodiment illustrated in FIG. 16, by forming the first reflectors 411 and the third reflectors 413 in an elliptical shape, a size of each of the first reflectors 411 and a size of each of the third reflectors 413 may be increased more than those of the exemplary embodiment illustrated in FIG. 15 so that the luminance at the upper side and the lower side of the virtual image IM may be further prevented from being lower than the luminance at a center of the virtual image IM or reduced.

Figure 17:
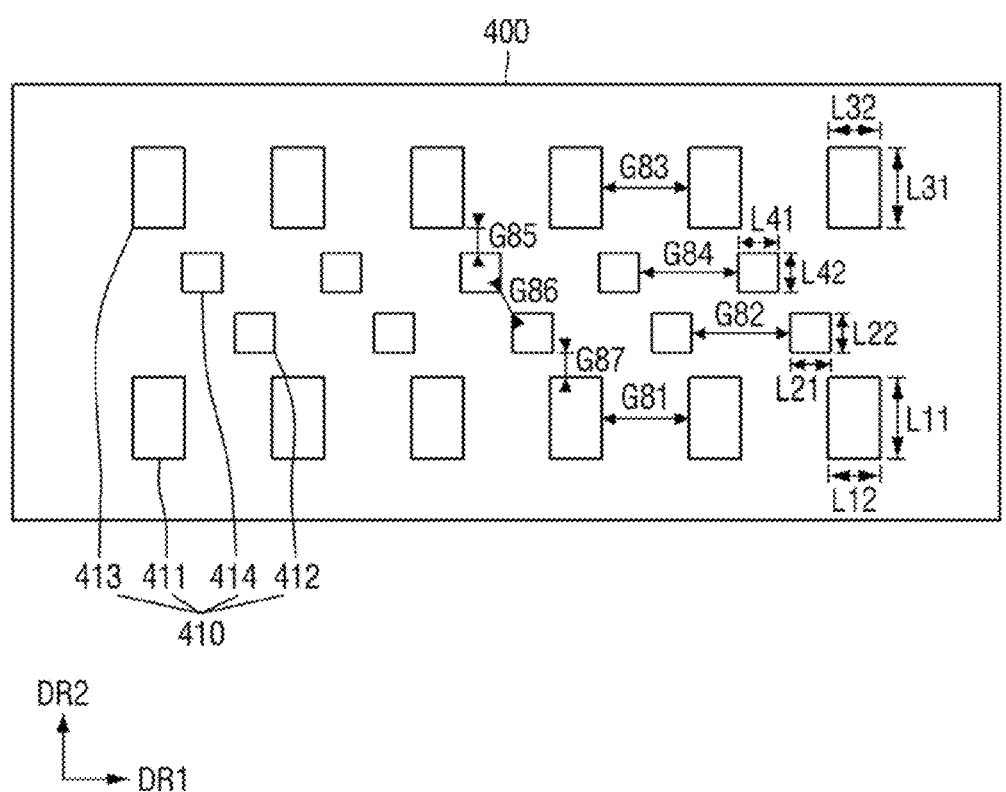
FIG. 17 is a plan view illustrating an example of reflectors of the reflector substrate of FIGS. 4 and 5.

FIG. 17 is a plan view illustrating an example of reflectors of the reflector substrate of FIGS. 4 and 5.

The exemplary embodiment illustrated in FIG. 17 is different from the exemplary embodiment illustrated in FIG. 15 in that first reflectors 411 and third reflectors 413 have a quadrangular shape. FIG. 17 will be described focusing on differences from the exemplary embodiment illustrated in FIG. 15.

Referring to FIG. 17, a minimum distance G81 between the first reflectors 411 adjacent to each other may be smaller than a minimum distance G82 between second reflectors 412 adjacent to each other. A minimum distance G83 between the third reflectors 413 adjacent to each other may be smaller than the minimum distance G82 between the second reflectors 412 adjacent to each other. The minimum distance G81 between the first reflectors 411 adjacent to each other may be smaller than a minimum distance G84 between fourth reflectors 414 adjacent to each other. The minimum distance G83 between the third reflectors 413 adjacent to each other may be smaller than the minimum distance G84 between the fourth reflectors 414 adjacent to each other.

A minimum distance G85 between the third reflector 413 and the fourth reflector 414, which are adjacent to each other, a minimum distance G86 between the second reflector 412 and the fourth reflector 414, which are adjacent to each other, a minimum distance G87 between the first reflector 411 and the second reflector 412, which are adjacent to each other, may be smaller than the minimum distance G81 between the first reflectors 411 adjacent to each other, the minimum distance G82 between the second reflectors 412 adjacent to each other, the minimum distance G83 between the third reflectors 413 adjacent to each other, and the minimum distance G84 between the fourth reflectors 414 adjacent to each other. The minimum distance G86 between the second reflector 412 and the fourth reflector 414, which are adjacent to each other, may be smaller than the minimum distance G87 between the first reflector 411 and the second reflector 412, which are adjacent to each other, and the minimum distance G85 between the third reflector 413 and the fourth reflector 414 that are adjacent to each other.

The minimum distance G81 between the first reflectors 411 adjacent to each other may be substantially equal to the minimum distance G83 between the third reflectors 413 adjacent to each other. The minimum distance G82 between the second reflectors 412 adjacent to each other may be substantially equal to the minimum distance G4 between the fourth reflectors 414 adjacent to each other. The minimum distance G87 between the first reflector 411 and the second reflector 412, which are adjacent to each other, may be substantially equal to the minimum distance G85 between the third reflector 413 and the fourth reflector 414 that are adjacent to each other.

When each of the first reflectors 411, the second reflectors 412, the third reflectors 413, and the fourth reflectors 414 has a rectangular shape in a plan view, a length L11 of each of the first reflectors 411 in the second direction DR2 and a length L12 of each of the first reflectors 411 in the first direction DR1 may be greater than a length L22 of each of the second reflectors 412 in the second direction DR2 and a length L21 of each of the second reflectors 412 in the first direction DR1. A length L31 of each of the third reflectors 413 in the second direction DR2 and a length L32 of each of the third reflectors 413 in the first direction DR1 may be greater than the length L22 of each of the second reflectors 412 in the second direction DR2 and the length L21 of each of the second reflectors 412 in the first direction DR1. The length L11 of each of the first reflectors 411 in the second direction DR2 and the length L12 of each of the first reflectors 411 in the first direction DR1 may be greater than a length L42 of each of the fourth reflectors 414 in the second direction DR2 and a length L4/ of each of the fourth reflectors 414 in the first direction DR1. The length L31 of each of the third reflectors 413 in the second direction DR2 and the length L32 of each of the third reflectors 413 in the first direction DR1 may be greater than the length L42 of each of the fourth reflectors 414 in the second direction DR2 and the length L41 of each of the fourth reflectors 414 in the first direction DR. The length L11 of each of the first reflectors 411 in the second direction DR2 and the length L12 of each of the first reflectors 411 in the first direction DR1 may be substantially equal to the length L31 of each of the third reflectors 413 in the second direction DR2 and the length L32 of each of the third reflectors 413 in the first direction DR1. The length L21 of each of the second reflectors 412 in the first direction DR1 and the length L22 of each of the second reflectors 412 in the second direction DR2 may be substantially equal to the length L41 of each of the fourth reflectors 414 in the first direction DR1 and the length L42 of each of the fourth reflectors 414 in the second direction DR2.

The length L11 of each of the first reflectors 411 in the second direction DR2 may be greater than the length L12 of each of the first reflectors 411 in the first direction DR1. The length L21 of each of the second reflectors 412 in the first direction DR1 may be substantially equal to the length L22 of each of the second reflectors 412 in the second direction DR2. The length L31 of each of the third reflectors 413 in the second direction DR2 may be greater than the length L32 of each of the third reflectors 413 in the first direction DR1. The length L41 of each of the fourth reflectors 414 in the first direction DR1 may be substantially equal to the length L42 of each of the fourth reflectors 414 in the second direction DR2.

As illustrated in FIG. 17, in a plan view, when a size of each of the first reflectors 411 and a size of each of the third reflectors 413 are greater than a size of each of the second reflectors 412 and a size of each of the fourth reflectors 414, the sharpness of the virtual image IM, which is reflected from the second reflectors 412 and the fourth reflectors 414 and shown to the user, is higher than the sharpness of the virtual image IM that is reflected from the first reflectors 411 and the third reflectors 413 and shown to the user. However, the luminance of the virtual image IM, which is reflected from the first reflectors 411 and the third reflectors 413 and shown to the user, may be higher than the luminance of the virtual image IM that is reflected from the second reflectors 412 and the fourth reflectors 414 and shown to the user.

According to the exemplary embodiment illustrated in FIG. 17, the sharpness of the virtual image IM shown to the user may be increased by reflecting the light of the first display device 210 from the second reflectors 412 and the fourth reflectors 414, and at the same time, the luminance of the virtual image IM shown to the user may be increased by reflecting the light of the first display device 210 from the first reflectors 411 and the third reflectors 413.

Further, since the first reflectors 411 are disposed on a lower side of the reflector substrate 400 and the third reflectors 413 are disposed on an upper side of the reflector substrate 400, the luminance of the virtual image IM at the upper side and the lower side of the reflector substrate 400 may be reduced or prevented from being lower than the luminance of the virtual image IM at a center of the reflector substrate 400.

Figure 18:
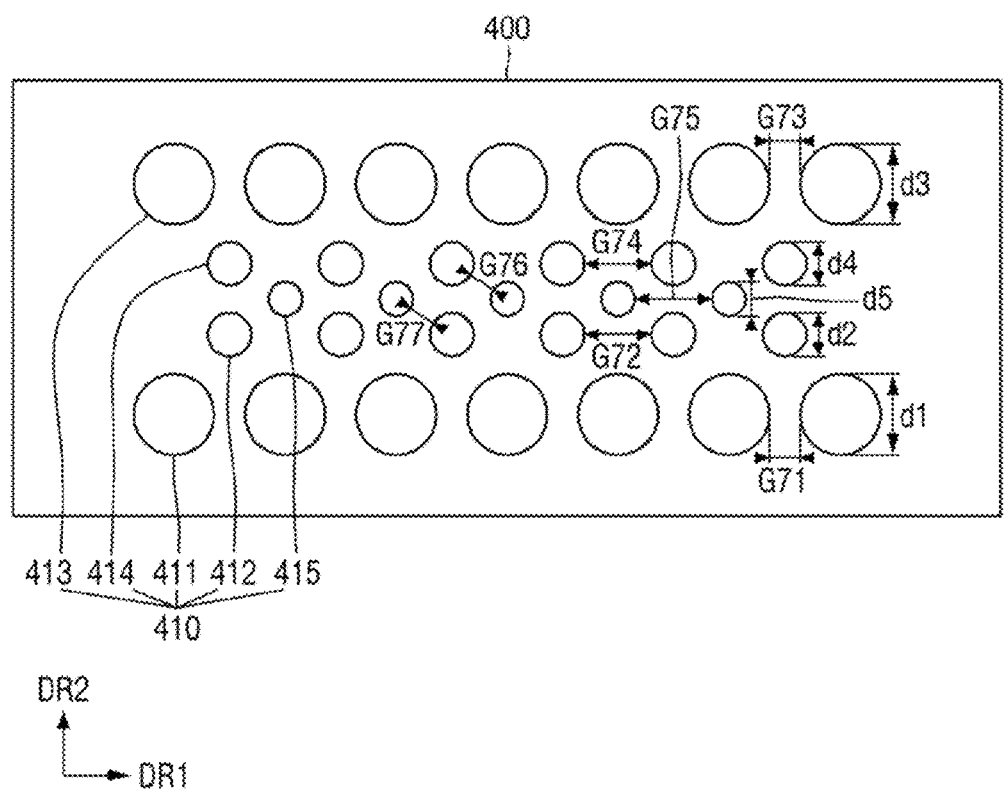
FIG. 18 is a plan view illustrating an example of reflectors of the reflector substrate of FIGS. 4 and 5.

FIG. 18 is a plan view illustrating an example of reflectors of the reflector substrate of FIGS. 4 and 5.

The exemplary embodiment illustrated in FIG. 18 is different from the exemplary embodiment illustrated in FIG. 6 in that gaps between first reflectors 411, gaps between second reflectors 412, and gaps between third reflectors 413 in the first direction DR1 are different from each other. FIG. 18 will be described focusing on differences from the exemplary embodiment illustrated in FIG. 6.

Referring to FIG. 18, gaps G41, G42, and G43 between the first reflectors 411 may increase in size toward one side of the reflector substrate 400 from a center of the reflector substrate 400 in the first direction DR1. In other words, the gap G41 between the first reflectors 411, which are disposed adjacent to each other at the center of the reflector substrate 400 in the first direction DR1, may be smaller than the gap G42 between the first reflectors 411 that are disposed adjacent to each other at positions between one side and the center of the reflector substrate 400 in the first direction DR1. In addition, the gap G42 between the first reflectors 411, which are disposed adjacent to each other at positions between one side and the center of the reflector substrate 400 in the first direction DR1, may be smaller than the gap G43 between the first reflectors 411 that are disposed adjacent to each other at one side of the reflector substrate 400 in the first direction DR1. For example, the size of the gaps G41, G42, and G43 between the first reflectors 411 may sequentially increase toward one side of the reflector substrate 400 from the center of the reflector substrate 400 in the first direction DR1.

Gaps G51, G52, G53, and G54 between the second reflectors 412 may increase in size toward one side of the reflector substrate 400 from the center of the reflector substrate 400 in the first direction DR1. In other words, the gap G51 between the second reflectors 412, which are adjacent to each other at the center of the reflector substrate 400 in the first direction DR1, may be smaller than the gap G52 between the second reflectors 412 that are adjacent to each other at positions between one side and the center of the reflector substrate 400 in the first direction DR1. In addition, the gap G52 between the second reflectors 412, which are adjacent to each other at positions between one side and the center of the reflector substrate 400 in the first direction DR1, may be smaller than the gap G53 between the second reflectors 412 that are adjacent to each other at one side and the center of the reflector substrate 400 in the first direction DR1. In addition, the gap G53 between the second reflectors 412, which are adjacent to each other at positions between one side and the center of the reflector substrate 400 in the first direction DR1, may be smaller than the gap G54 between the second reflectors 412 that are adjacent to each other at one side of the reflector substrate 400 in the first direction DR1. For example, the size of the gaps G51, G52, G53, and G54 between the second reflectors 412 may sequentially increase toward one side of the reflector substrate 400 from the center of the reflector substrate 400 in the first direction DR1.

Gaps G61, G62, and G63 between the third reflectors 413 may increase in size toward one side of the reflector substrate 400 from the center of the reflector substrate 400 in the first direction DR1. In other words, the gap G61 between the third reflectors 413, which are adjacent to each other at the center of the reflector substrate 400 in the first direction DR1, may be smaller than the gap G62 between the third reflectors 413 that are adjacent to each other at positions between one side and the center of the reflector substrate 400 in the first direction DR1. In addition, the gap G62 between the third reflectors 413, which are adjacent to each other at positions between one side and the center of the reflector substrate 400 in the first direction DR1, may be smaller than the gap G63 between the third reflectors 413 that are adjacent to each other at one side of the reflector substrate 400 in the first direction DR1. For example, the size of the gaps G61, G62, and G63 between the third reflectors 413 may sequentially increase toward one side of the reflector substrate 400 from the center of the reflector substrate 400 in the first direction DR1.

According to the exemplary embodiment illustrated in FIG. 18, the first reflectors 411, the second reflectors 412, and the third reflectors 413 are densely arranged in the center of the reflector substrate 400 in the first direction DR1 as compared to those of the exemplary embodiment illustrated in FIG. 6 so that the sharpness and the luminance of the virtual image IM, which is shown to the user, at the center of the reflector substrate 400 may be increased.

Figure 19:
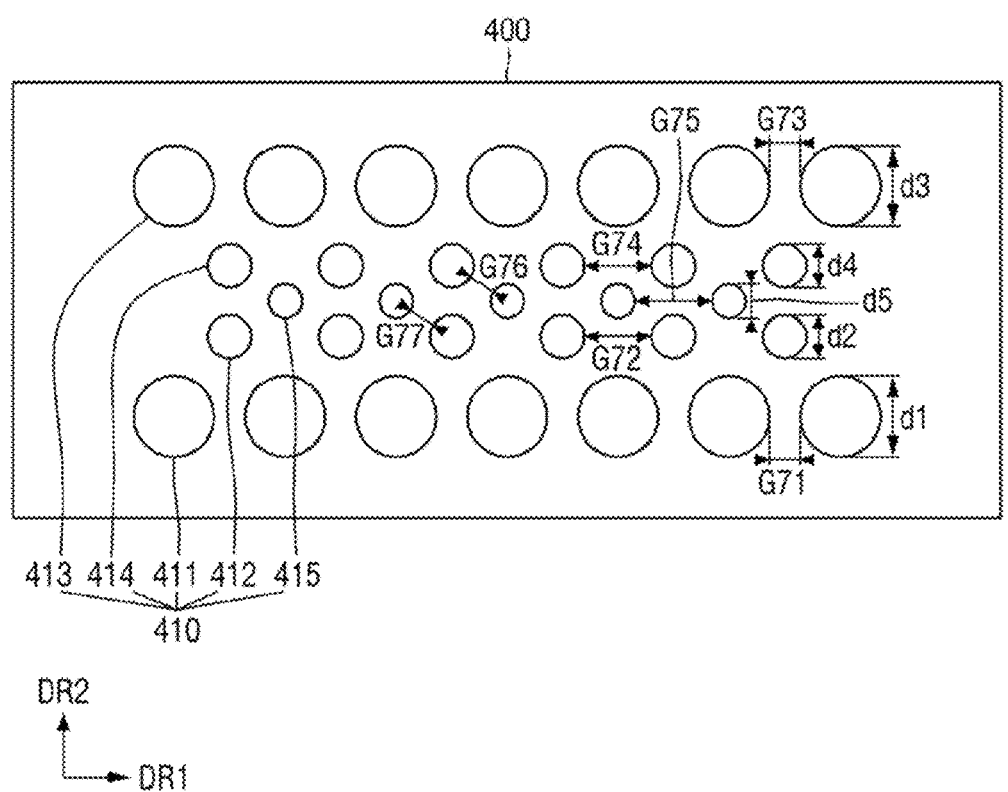
FIG. 19 is a plan view illustrating an example of reflectors of the reflector substrate of FIGS. 4 and 5.

FIG. 19 is a plan view illustrating an example of reflectors of the reflector substrate of FIGS. 4 and 5.

The exemplary embodiment illustrated in FIG. 19 is different from the exemplary embodiment illustrated in FIG. 6 in that fourth reflectors 414 and fifth reflectors 415 are additionally disposed. FIG. 19 will be described focusing on differences from the exemplary embodiment illustrated in FIG. 6.

Referring to FIG. 19, the fourth reflectors 414 may be arranged in the first direction DR1. Gaps between the fourth reflectors 414 in the first direction DR1 may be equal to each other. In the alternative, the gaps between the fourth reflectors 414 in the first direction DR1 may not be equal to each other. The fourth reflectors 414 may be disposed at positions farther from a first side of the reflector substrate 400 than second reflectors 412. For example, as illustrated in FIG. 19, the fourth reflectors 414 may be disposed at positions farther from a lower side of the reflector substrate 400 than the second reflectors 412. The lower side of the reflector substrate 400 is adjacent to the first surface of the right-eye lens 110, and thus, the fourth reflectors 414 may be disposed at positions farther from the first surface of the right-eye lens 110 than the second reflectors 412. In addition, the fourth reflectors 414 may be disposed at positions farther from a second side of the reflector substrate 400 than third reflectors 413. For example, as illustrated in FIG. 19, the fourth reflectors 414 may be disposed at positions farther from an upper side of the reflector substrate 400 than the third reflectors 413. The upper side of the reflector substrate 400 is adjacent to the second surface of the right-eye lens 110, and thus, the fourth reflectors 414 may be disposed at positions farther from the second surface of the right-eye lens 110 than the third reflectors 413.

The fifth reflectors 415 may be arranged in the first direction DR1. The fifth reflectors 415 may be disposed at a center of the reflector substrate 400 in the second direction DR2. Gaps between the fifth reflectors 415 in the first direction DR1 may be equal to each other. In the alternative, the gaps between the fifth reflectors 415 in the first direction DR1 may not be equal to each other. The fifth reflectors 415 may be disposed at positions farther from the first side of the reflector substrate 400 than the second reflectors 412. For example, as illustrated in FIG. 19, the fifth reflectors 415 may be disposed at positions farther from the lower side of the reflector substrate 400 than the second reflectors 412. The lower side of the reflector substrate 400 is adjacent to the first surface of the right-eye lens 110, and thus, the fifth reflectors 415 may be disposed at positions farther from the first surface of the right-eye lens 110 than the second reflectors 412. In addition, the fifth reflectors 415 may be disposed at positions farther from the second side of the reflector substrate 400 than the fourth reflectors 414. For example, as illustrated in FIG. 19, the fifth reflectors 415 may be disposed at positions farther from the upper side of the reflector substrate 400 than the fourth reflectors 414. The upper side of the reflector substrate 400 is adjacent to the second surface of the right-eye lens 110, and thus, the fifth reflectors 415 may be disposed at positions farther from the second surface of the right-eye lens 110 than the fourth reflectors 414. In addition, the fifth reflectors 415 may be arranged in a row along the first direction DR1 between rows of the second and fourth reflectors 412 and 414 arranged in the first direction DR1.

A minimum distance G71 between first reflectors 411 adjacent to each other may be smaller than a minimum distance G74 between the fourth reflectors 414 adjacent to each other. A minimum distance G73 between third reflectors 413 adjacent to each other may be smaller than the minimum distance G74 between the fourth reflectors 414 adjacent to each other. The minimum distance G71 between the first reflectors 411 adjacent to each other may be smaller than a minimum distance G72 between second reflectors 412 adjacent to each other. The minimum distance G73 between the third reflectors 413 adjacent to each other may be smaller than the minimum distance G72 between the second reflectors 412 adjacent to each other.

The minimum distance G71 between the first reflectors 411 adjacent to each other may be smaller than a minimum distance G75 between the fifth reflectors 415 adjacent to each other. The minimum distance G72 between the second reflectors 412 adjacent to each other may be smaller than the minimum distance G75 between the fifth reflectors 415 adjacent to each other. The minimum distance G73 between the third reflectors 413 adjacent to each other may be smaller than the minimum distance G75 between the fifth reflectors 415 adjacent to each other. The minimum distance G74 between the fourth reflectors 414 adjacent to each other may be smaller than the minimum distance G75 between the fifth reflectors 415 adjacent to each other.

A minimum distance G76 between the fourth reflectors 414 and the fifth reflectors 415, which are adjacent to each other, and a minimum distance G77 between the second reflectors 412 and the fifth reflectors 415, which are adjacent to each other, may be smaller than the minimum distance G71 between the first reflectors 411 adjacent to each other, the minimum distance G72 between the second reflectors 412 adjacent to each other, the minimum distance G73 between the third reflectors 413 adjacent to each other, the minimum distance G74 between the fourth reflectors 414 adjacent to each other, and the minimum distance G75 between the fifth reflectors 415 adjacent to each other. The minimum distance G71 between the first reflectors 411 adjacent to each other may be substantially equal to the minimum distance G73 between the third reflectors 413 adjacent to each other. The minimum distance G72 between the second reflectors 412 adjacent to each other may be substantially equal to the minimum distance G74 between the fourth reflectors 414 adjacent to each other.

In a plan view, a size of each of the first reflectors 411 may be greater than a size of each of the second reflectors 412. In a plan view, a size of each of the third reflectors 413 may be greater than the size of each of the second reflectors 412. In a plan view, the size of each of the first reflectors 411 may be greater than a size of each of the fourth reflectors 414. In a plan view, the size of each of the third reflectors 413 may be greater than the size of each of the fourth reflectors 414. In a plan view, the size of each of the second reflectors 412 may be greater than a size of each of the fifth reflectors 415. In a plan view, the size of each of the fourth reflectors 414 may be greater than the size of each of the fifth reflectors 415. In a plan view, the size of each of the first reflectors 411 may be substantially equal to the size of each of the third reflectors 413. In a plan view, the size of each of the second reflectors 412 may be substantially equal to the size of each of the fourth reflectors 414.

When each of the first reflectors 411, the second reflectors 412, and the third reflectors 413 has a circular shape in a plan view, a diameter d1 of each of the first reflectors 411 may be greater than a diameter d2 of each of the second reflectors 412. A diameter d3 of each of the third reflectors 413 may be greater than the diameter d2 of each of the second reflectors 412. The diameter d1 of each of the first reflectors 411 may be greater than a diameter d4 of each of the fourth reflectors 414. The diameter d3 of each of the third reflectors 413 may be greater than the diameter d4 of each of the fourth reflectors 414. The diameter d2 of each of the second reflectors 412 may be greater than a diameter d5 of each of the fifth reflectors 415. The diameter d4 of each of the fourth reflectors 414 may be greater than the diameter d5 of each of the fifth reflectors 415. The diameter d1 of each of the first reflectors 411 may be substantially equal to the diameter d3 of each of the third reflectors 413. The diameter d2 of each of the second reflectors 412 may be substantially equal to the diameter d4 of each of the fourth reflectors 414.

As illustrated in FIG. 19, in a plan view, when the size of each of the first reflectors 411 and the size of each of the third reflectors 413 are greater than the size of each of the second reflectors 412 and the size of each of the fourth reflectors 414, and the size of each of the fifth reflectors 415 is smaller than the size of each of the second reflectors 412 and the size of each of the fourth reflectors 414, the sharpness of the virtual image IM, which is reflected from the fifth reflectors 415 and shown to the user, is higher than the sharpness of the virtual image IM that is reflected from the first reflectors 411 and the third reflectors 413 and shown to the user. However, the luminance of the virtual image IM, which is reflected from the first reflectors 411 and the third reflectors 413 and shown to the user, may be higher than the luminance of the virtual image IM that is reflected from the second reflectors 412 and the fourth reflectors 414 and shown to the user.

According to the exemplary embodiment illustrated in FIG. 19, the sharpness of the virtual image IM shown to the user may be increased by further including the fifth reflectors 415, each of which is smaller in size than each of the second reflectors 412 and each of the fourth reflectors 414, and by reflecting the light of the first display device 210 from the fifth reflectors 415.

Figure 20:
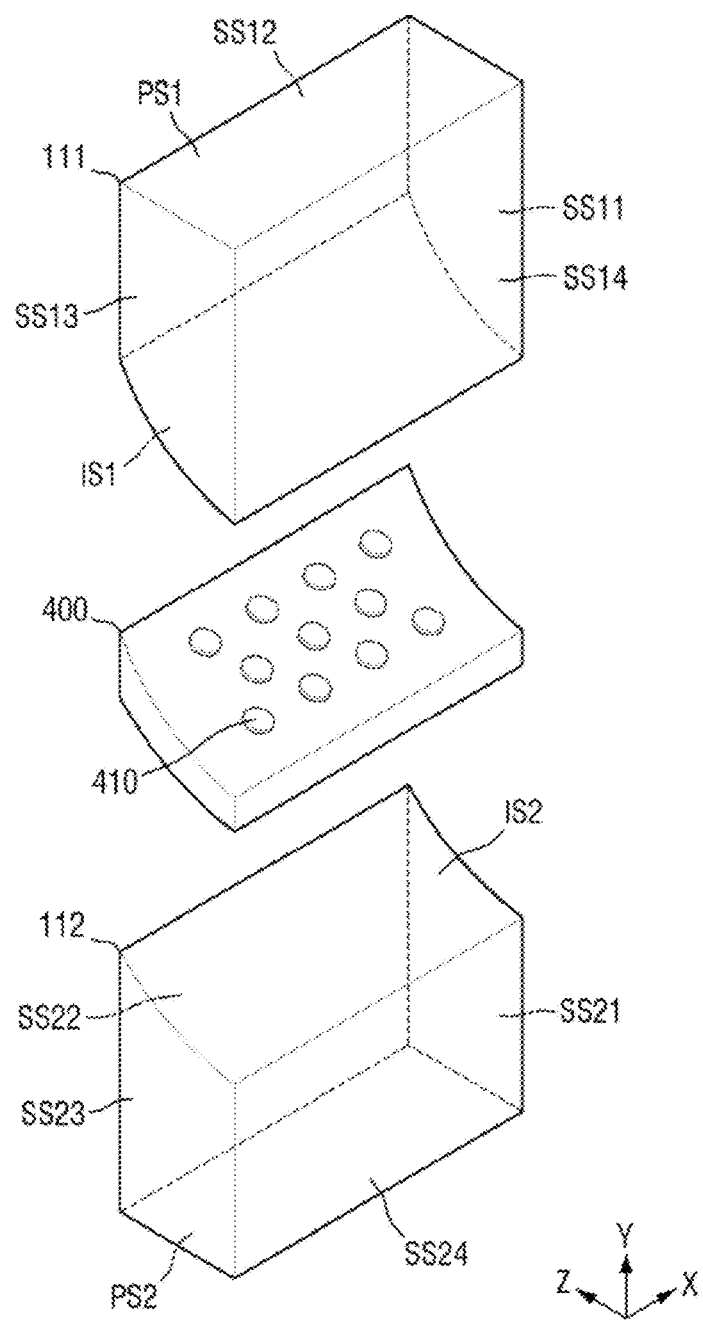
FIG. 20 is an exploded perspective view illustrating an example of the right-eye lens and the reflectors of FIGS. 1 to 3.
Figure 21:
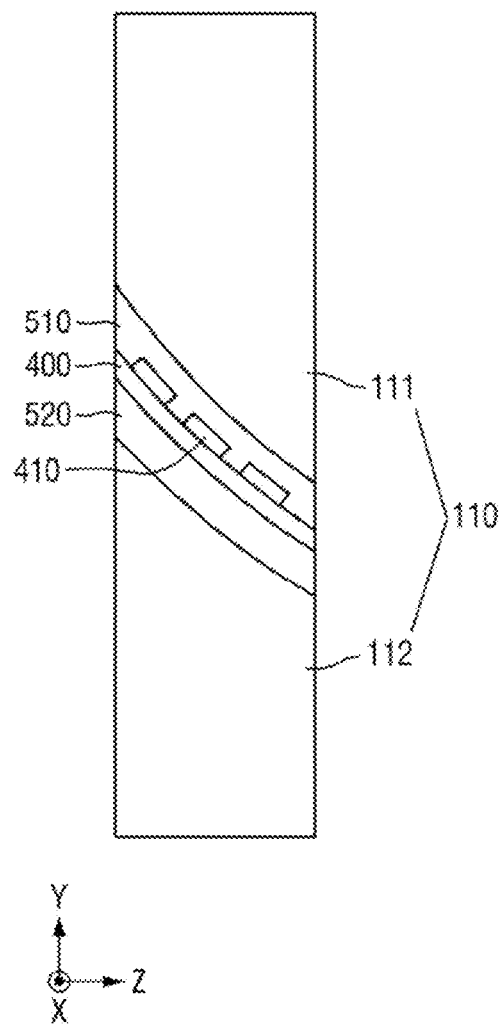
FIG. 21 is a side view illustrating an example of the right-eye lens and the reflectors of FIG. 20.

FIG. 20 is an exploded perspective view illustrating an example of the right-eye lens and the reflectors of FIGS. 1 to 3. FIG. 21 is a side view illustrating an example of the right-eye lens and the reflectors of FIG. 20.

The exemplary embodiment illustrated in FIGS. 20 and 21 is different from the exemplary embodiment illustrated in FIGS. 4 and 5 in that a first inclined surface IS1 of a first lens portion 111, a second inclined surface IS2 of a second lens portion 112, and a reflector substrate 400 have a curved surface. FIGS. 20 and 21 will be described focusing on differences from the exemplary embodiment illustrated in FIGS. 4 and 5.

Referring to FIGS. 20 and 21, the first inclined surface IS1 of the first lens portion 111 may be a curved surface that has a first curvature, and the second inclined surface IS2 of the second lens portion 112 may be a curved surface that has a second curvature. The first curvature and the second curvature may be substantially equal to each other, but the present inventive concept is not limited thereto. When the first curvature and the second curvature are different from each other, the first curvature may be greater than the second curvature.

The reflector substrate 400 may be bent to have a third curvature and disposed between the first inclined surface IS1 of the first lens portion 111 and the second inclined surface IS2 of the second lens portion 112. The third curvature may be substantially equal to the second curvature, but the present inventive concept is not limited thereto. When the third curvature is different from the second curvature, the third curvature may be greater than the second curvature, and the first curvature may be greater than the third curvature.

According to the exemplary embodiment illustrated in FIGS. 20 and 21, since the reflector substrate 400 is bent, a reflective surface of each of the reflectors 410 of the reflector substrate 400 may be bent. As a result, the virtual image IM reflected by the reflectors 410 may be collected and provided to a retina of the right eye RE of the user.

FIG. 22 is a plan view illustrating an example of the first display device of FIG. 2.

Referring to FIG. 22, a first display panel 211 of a first display device 210 may include a display area DA, a pad area PA, a scan driving circuit SDC, and an integrated driving circuit DDC.

The display area DA may include data lines DL, scan lines SL, and pixels PX. As illustrated in FIG. 22, the data lines DL may be disposed in the width direction (X-axis direction) of the right-eye lens 110, and the scan lines SL may be disposed in the thickness direction (Z-axis direction) of the right-eye lens 110. The pixels PX may be disposed in regions including the data lines DL and the scan lines SL. For example, the pixels PX may be disposed in intersection regions between the data lines DL and the scan lines SL. Detailed description of the pixels PX in the display area DA will be described below with reference to FIG. 23.

The pad area PA includes routing lines RL that are connected to the integrated driving circuit DDC, and pads DP that are connected to the routing lines RL. The pads DP may be electrically connected to the first circuit board 212. The first circuit board 212 may be attached on the pads DP using an anisotropic conductive film.

The scan driving circuit SDC may be disposed on a first side of the display area DA. The scan driving circuit SDC may be disposed to be adjacent to a long side of the display area DA. The scan driving circuit SDC is connected to the scan lines SL of the display area DA. The scan driving circuit SDC may receive a scan control signal from the integrated driving circuit DDC, generate scan signals according to the scan control signal, and sequentially apply the scan signals to the scan lines SL.

The scan driving circuit SDC may include thin-film transistors as switch elements. In this case, the thin-film transistors of the scan driving circuit SDC may be formed simultaneously with thin-film transistors of the pixels PX of the display area DA.

The integrated driving circuit DDC may be disposed on a second side of the display area DA. The integrated driving circuit DDC may be adjacent to a short side of the display area DA. The integrated driving circuit DDC may be disposed in the pad area PA. Alternatively, the integrated driving circuit DDC may be disposed on the first circuit board 212. The integrated driving circuit DDC may be an integrated circuit.

The integrated driving circuit DDC receives timing signals and video data through the routing lines RL. The integrated driving circuit DDC may generate the scan control signal from the timing signals and output the scan control signal to the scan driving circuit SDC. The integrated driving circuit DDC may generate a data control signal from the timing signals. The integrated driving circuit DDC may generate data voltages and apply the data voltages to the data lines DL during a period in which the scan signals are applied according to the data control signal and the video data.

FIG. 23 is a cross-sectional view illustrating a first display area of the first display panel of FIG. 22 in detail.

Referring to FIG. 23, a first display area DA1 of the first display device 210 may include a substrate 1100, a thin-film transistor layer 1230, a light-emitting element layer 1240, and a thin film encapsulation layer 1300.

The thin-film transistor layer 1230 is formed on the substrate 1100. The thin-film transistor layer 1230 includes thin-film transistors 1235, a gate insulating film 1236, an interlayer insulating film 1237, a protective film 1238, and a planarizing film 1239.

A buffer film may be formed on the substrate 1100. The buffer film may be used to protect the thin-film transistors 1235 and light-emitting elements from moisture permeating through the substrate 1100. The buffer film may include a plurality of inorganic films that are alternately stacked. For example, the buffer film may be a multi-film in which one or more inorganic films of a silicon oxide film (SiOx), a silicon nitride film (SiNx), and SiON are alternately stacked. The buffer film may be omitted.

The thin-film transistors 1235 are formed on the buffer film. Each of the thin-film transistors 1235 includes an active layer 1231, a gate electrode 1232, a source electrode 1233, and a drain electrode 1234. Each of the thin-film transistors 1235 is illustrated in FIG. 23 as being a top gate type in which the gate electrode 1232 is disposed above the active layer 1231, but the present inventive concept is not limited thereto. In other words, each of the thin-film transistors 1235 may be a bottom gate type in which the gate electrode 1232 is disposed below the active layer 1231 or a double gate type in which the gate electrode 1232 is disposed on both upper and lower portions of the active layer 1231.

The active layer 1231 is formed on the buffer film. The active layer 1231 may be formed of a silicon-based semiconductor material or an oxide-based semiconductor material. A light-blocking layer configured to block external light, which is incident on the active layer 1231, may be formed between the buffer film and the active layer 1231.

The gate insulating film 1236 may be formed on the active layer 1231. The gate insulating film 1236 may be formed of an inorganic film such as a silicon oxide (SiOx) film, a silicon nitride (SiNx) film, or a multi-film thereof.

The gate electrode 1232 and a gate line may be formed on the gate insulating film 1236. The gate electrode 1232 and the gate line may be formed of a single layer or a multi-layer made of one selected from molybdenum (Mo), aluminum (Al), chromium (Cr), gold (Au), titanium (Ti), nickel (Ni), neodymium (Nd), and copper (Cu), or an alloy thereof.

The interlayer insulating film 1237 may be formed on the gate electrode 1232 and the gate line. The interlayer insulating film 1237 may be formed of an inorganic film such as a silicon oxide (SiOx) film, a silicon nitride (SiNx) film, or a multi-film thereof.

The source electrode 1233, the drain electrode 1234, and a data line may be formed on the interlayer insulating film 1237. The source electrode 1233 and the drain electrode 1234 may be connected to the active layer 1231 through contact holes that pass through the gate insulating film 1236 and the interlayer insulating film 1237. The source electrode 1233, the drain electrode 1234, and the data line may be formed of a single layer or a multi-layer made of one selected from molybdenum (Mo), aluminum (Al), chromium (Cr), gold (Au), titanium (Ti), nickel (Ni), neodymium (Nd), and copper (Cu), or an alloy thereof.

The protective film 1238 may be formed on the source electrode 1233, the drain electrode 1234, and the data line to insulate the thin-film transistor 1235. The protective film 1238 may be formed of an inorganic film such as a silicon oxide (SiOx) film, a silicon nitride (SiNx) film, or a multi-film thereof.

The planarizing film 1239 may be formed on the protective film 1238 to planarize a stepped portion due to the thin-film transistor 1235. The planarizing film 1239 may be formed of an organic film made of an acryl resin, an epoxy resin, a phenolic resin, a polyamide resin, a polyimide resin, or the like.

The light-emitting element layer 1240 is formed on the thin-film transistor layer 1230. The light-emitting element layer 1240 includes light-emitting elements and a pixel definition film 1244.

The light-emitting elements and the pixel definition film 1244 are formed on the planarizing film 1239. The light-emitting element may include an organic light-emitting device. In this case, the light-emitting element may include an anode electrode 1241, light-emitting layers 1242, and a cathode electrode 1243.

The anode electrode 1241 may be formed on the planarizing film 1239. For example, the anode electrode 1241 may be directly disposed on the planarizing film 1239. The anode electrode 1241 may be connected to the source electrode 1233 of the thin-film transistor 1235 through contact holes that pass through the protective film 1238 and the planarizing film 1239.

To partition the pixels PX, the pixel definition film 1244 may be formed to cover an edge of the anode electrode 1241 on the planarizing film 1239. In other words, the pixel definition film 1244 may demarcate the pixels PX. Each of the pixels PX is a region in which the anode electrode 1241, the light-emitting layer 1242, and the cathode electrode 1243 are sequentially stacked and holes from the anode electrode 1241 and electrons from the cathode electrode 1243 combine in the light-emitting layer 1242 to emit light.

The light-emitting layers 1242 are formed on the anode electrode 1241 and the pixel definition film 1244. The light-emitting layer 1242 may be an organic light-emitting layer. The light-emitting layer 1242 may emit one of red light, green light, and blue light. A peak wavelength of the red light may be in a range of about 620 nm to 750 nm, and a peak wavelength of the green light may be in a range of about 495 nm to 570 nm. In addition, a peak wavelength of the blue light may be in a range of about 450 nm to 495 nm. Alternatively, the light-emitting layer 1242 may be a white light-emitting layer that emits white light, and in this case, the light-emitting layer 1242 may have a shape in which a red light-emitting layer, a green light-emitting layer, and a blue light-emitting layer are stacked and may be a common layer that is commonly formed in the pixels PX. In this case, the display device 210 may further include a separate color filter configured to display red, green, and blue.

The light-emitting layer 1242 may include a hole transporting layer, a light-emitting layer, and an electron transporting layer. In addition, the light-emitting layer 1242 may have a tandem structure of two or more stacks, and in this case, a charge generation layer may be disposed between the stacks.

The cathode electrode 1243 is formed on the light-emitting layer 1242. The cathode electrode 1243 may cover the light-emitting layer 1242. The cathode electrode 1243 may be a common layer that is commonly formed in the pixels PX.

When the light-emitting element layer 1240 is formed in a top emission type in which light is emitted in an upper portion direction, the anode electrode 1241 may be made of a metal material having high reflectivity, and for example, may include a stacked structure (Ti/Al/Ti) of aluminum and titanium, a stacked structure (ITO/Al/ITO) of aluminum and indium tin oxide (ITO), a silver-palladium-copper (APC) alloy, and a stacked structure (ITO/APC/ITO) of an APC alloy and ITO. The APC alloy is an alloy of silver (Ag), palladium (Pd), and copper (Cu). In addition, the cathode electrode 1243 may be formed of a transparent conductive material (TCO) capable of transmitting light, such as ITO or indium zinc oxide (IZO) or may be formed of a semi-transmissive conductive material such as magnesium (Mg), silver (Ag), or an alloy of magnesium (Mg) and silver (Ag). When the cathode electrode 1243 is formed of the semi-transmissive conductive material, light emission efficiency may be improved due to a microcavity.

When the light-emitting element layer 1240 is formed in a bottom emission type in which light is emitted in a lower portion direction, the anode electrode 1241 may be formed of a transparent conductive material (TCO), such as ITO or IZO, or may be formed of a semi-transmissive conductive material such as magnesium (Mg), silver (Ag), or an alloy of magnesium (Mg) and silver (Ag). The cathode electrode 1243 may be formed of a metal material having high reflectivity, and for example, may have a stacked structure (Ti/Al/Ti) of aluminum and titanium, a stacked structure (ITO/Al/ITO) of aluminum and ITO, a silver-palladium-copper (APC) alloy, and a stacked structure (ITO/APC/ITO) of an APC alloy and ITO. When the anode electrode 1241 is formed of the semi-transmissive conductive material, light emission efficiency may be improved due to a microcavity.

The thin film encapsulation layer 1300 is formed on the light-emitting element layer 1240. The thin film encapsulation layer 1300 prevents oxygen or moisture from permeating into the light-emitting layer 1242 and the cathode electrode 1243. To accomplish this, the thin film encapsulation layer 1300 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. In addition, the thin film encapsulation layer 1300 may further include at least one organic film. The organic film may have a sufficient thickness to prevent particles from passing through the thin film encapsulation layer 1300 and penetrating into the light-emitting layer 1242 and the cathode electrode 1243. The organic film may include one selected from an epoxy, acrylate, and urethane acrylate. An encapsulation substrate may be disposed on the light-emitting element layer 1240 instead of the thin film encapsulation layer 1300.

In an optical device according to an exemplary embodiment of the present inventive concept, a size of each of reflectors, which are disposed on a first side and a second side of a reflector substrate in a second direction, is formed to be greater than a size of each of reflectors that are disposed at a center of the reflector substrate in the second direction. Thus, the sharpness of a virtual image shown to a user can be increased by reflecting light of a first display device from the reflectors disposed at the center of the reflector substrate in the second direction, and at the same time, the luminance of the virtual image shown to the user can be increased by reflecting the light of the first display device from the reflectors disposed on the first side and the second side of the reflector substrate in the second direction.

In an optical device according to an exemplary embodiment of the present inventive concept, a reflector substrate on which reflectors are deposited is attached to a first inclined surface of a first lens of a right-eye lens using a first adhesive layer and is attached to a second inclined surface of a second lens of the right-eye lens using a second adhesive layer. Thus, the right-eye lens including the reflectors, which are inclined at a predetermined angle in a height direction of the right-eye lens relative to a width direction of the right-eye lens, can be easily manufactured.

An exemplary embodiment of the present inventive concept provides an optical device capable of increasing the sharpness of a virtual image that is visible to a user to provide augmented reality and widening a field of view of the virtual image.

While the present inventive concept has been particularly shown and described with reference to the exemplary embodiments thereof, it will be understood by those of ordinary skill in the art that various changes in form and detail may be made thereto without departing from the spirit and scope of the present inventive concept as set forth in the following claims.

What is claimed is:

1. An optical device, comprising:
a display device configured to display an image; and
a lens including a plurality of reflectors that reflect the image from the display device to a first surface of the lens,
wherein the plurality of reflectors include:
a first reflector; and
a second reflector having a size different from a size of the first reflector,
wherein a bottom surface of the first reflector and a bottom surface of the second reflector are located on one flat surface or one curved surface.

2. The optical device of claim 1, wherein
the second reflector is located farther from the first surface of the lens than the first reflector in a thickness direction of the lens, and
the size of the first reflector is greater than the size of the second reflector.

3. The optical device of claim 1, wherein each of the first reflector and the second reflector has a circular shape in a plan view.

4. The optical device of claim 1, wherein each of the first reflector and the second reflector has a polygonal shape in a plan view.

5. The optical device of claim 1, wherein each of the first reflector and the second reflector has a hexagonal shape in a plan view.

6. The optical device of claim 5, wherein a side of the first reflector and a side of the second reflector are parallel to each other.

7. The optical device of claim 1, wherein the plurality of reflectors further include a third reflector that has a size different from the size of the second reflector.

8. The optical device of claim 7, wherein the third reflector is located closer to a second surface of the lens, which is opposite to the first surface of the lens, than the second reflector in a thickness direction of the lens, and
the size of the third reflector is greater than the size of the second reflector.

9. The optical device of claim 7, wherein the size of the first reflector and the size of the third reflector are equal to each other.

10. The optical device of claim 7, wherein the plurality of reflectors further include a fourth reflector that has a size different from the size of the first reflector and the size of the third reflector.

11. The optical device of claim 10, wherein
the fourth reflector is closer to a second surface of the lens, which is opposite to the first surface of the lens, than the second reflector in a thickness direction of the lens, and is farther from the second surface of the lens than the third reflector in the thickness direction of the lens, and
the size of the second reflector and the size of the fourth reflector are equal to each other.

12. The optical device of claim 10, wherein each of the first reflector, the second reflector, the third reflector, and the fourth reflector has a circular shape in a plan view.

13. The optical device of claim 10, wherein each of the second reflector and the fourth reflector has a circular shape in a plan view, and each of the first reflector and the third reflector has an elliptical shape in a plan view.

14. The optical device of claim 10, wherein each of the second reflector and the fourth reflector has a square shape in a plan view, and each of the first reflector and the third reflector has a rectangular shape in a plan view.

15. The optical device of claim 10, wherein the plurality of reflectors further include a fifth reflector that has a size different from the size of the first reflector, the size of the second reflector, the size of the third reflector, and the size of the fourth reflector.

16. The optical device of claim 15, wherein
the fifth reflector is farther from the first surface of the lens than the second reflector in a thickness direction of the lens, and is farther from a second surface of the lens, which is opposite to the first surface of the lens, than the fourth reflector in the thickness direction of the lens, and the size of the fifth reflector is smaller than the size of the second reflector and the size of the fourth reflector, and the size of the second reflector and the size of the fourth reflector are smaller than the size of the first reflector and the size of the third reflector.

17. The optical device of claim 1, wherein the lens further includes:
a first lens having a first inclined surface;
a second lens having a second inclined surface facing the first inclined surface; and
a reflector substrate disposed between the first inclined surface of the first lens and the second inclined surface of the second lens and having a first surface on which the plurality of reflectors are disposed.

18. The optical device of claim 17, wherein the lens further includes:
a first adhesive layer disposed between the first surface of the reflector substrate and the first inclined surface of the first lens; and
a second adhesive layer disposed between a second surface of the reflector substrate, which is opposite to the first surface of the reflector substrate, and the second inclined surface of the second lens.

19. The optical device of claim 17, wherein each of the first inclined surface and the second inclined surface is a flat surface.

20. The optical device of claim 17, wherein each of the first inclined surface and the second inclined surface is a curved surface.

21. An optical device, comprising:
a display device configured to display an image; and
a lens including a plurality of reflectors that reflect the image from the display device to a first surface of the lens,
wherein the plurality of reflectors include first reflectors arranged in a line along a lengthwise direction of a substrate and second reflectors arranged in a line along the lengthwise direction of the substrate, wherein the line of first reflectors is spaced apart from the line of second reflectors along a second direction intersecting the lengthwise direction, and
a size of each of the first reflectors is different from a size of each of the second reflectors.

22. The optical device of claim 21, wherein a gap between a first pair of first reflectors, which are adjacent to each other, among the first reflectors is different from a gap between a second pair of first reflectors, which are adjacent to each other, among the first reflectors.

23. The optical device of claim 22, wherein the gap between the first pair of first reflectors is greater than the gap between the second pair of first reflectors.

24. The optical device of claim 23, wherein the second pair of first reflectors is closer to a center of the lens than the first pair of first reflectors.

25. An optical device, comprising:
a display device configured to display an image; and
a lens including a plurality of reflectors that reflect the image from the display device to a first surface of the lens,
wherein the lens further includes:
a first lens having a first inclined surface;
a second lens having a second inclined surface facing the first inclined surface; and
a reflector substrate disposed between the first inclined surface of the first lens and the second inclined surface of the second lens and having a first surface on which the plurality of reflectors are disposed,
wherein the lens further includes:
a first adhesive layer disposed between and in direct contact with the first surface of the reflector substrate and the first inclined surface of the first lens; and
a second adhesive layer disposed between and in direct contact with a second surface of the reflector substrate, which is opposite to the first surface of the reflector substrate, and the second inclined surface of the second lens.

26. The optical device of claim 25, wherein each of the first inclined surface and the second inclined surface is flat or curved.

27. The optical device of claim 25, wherein each of the first inclined surface and the second inclined surface is curved.

28. The optical device of claim 25, wherein the plurality of reflectors include: a first reflector; and
a second reflector having a size different from a size of the first reflector.

29. An optical device, comprising:
a display device configured to display an image; and
a lens including a plurality of reflectors that reflect the image from the display device to a first surface of the lens,
wherein the plurality of reflectors include a first reflector, a second reflector, a third reflector, and a fourth reflector,
the second reflector and the fourth reflector are disposed between the first reflector and the third reflector in a width direction of the lens, and
sizes of the second reflector and the fourth reflector are smaller than sizes of the first reflector and the third reflector.

30. An optical device, comprising:
a display device configured to display an image; and
a lens including a plurality of reflectors that reflect the image from the display device to a first surface of the lens,
wherein the plurality of reflectors include:
a plurality of first reflectors arranged in a line along a lengthwise direction of a reflector substrate; and
a plurality of second reflectors arranged in a line along the lengthwise direction of the reflector substrate, wherein each of the second reflectors has a size smaller than a size of each of the first reflectors,
wherein each of the second reflectors is farther from a first side of the reflector substrate than a corresponding one of the first reflectors in a direction perpendicular to the lengthwise direction, and
wherein the first side of the reflector substrate is adjacent to the first surface of the lens.

* * * * *